US010173401B2

(12) United States Patent
Aridomi et al.

(10) Patent No.: US 10,173,401 B2
(45) Date of Patent: *Jan. 8, 2019

(54) SUBSTRATE WITH DECORATIVE MATERIAL, TRANSFER MATERIAL FOR FORMING DECORATIVE LAYER, TOUCH PANEL, AND INFORMATION DISPLAY DEVICE

(71) Applicant: FUJIFILM Corporation, Tokyo (JP)

(72) Inventors: Takashi Aridomi, Fujinomiya (JP); Saori Asada, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,031

(22) Filed: Jan. 18, 2017

(65) Prior Publication Data

US 2017/0131814 A1    May 11, 2017

Related U.S. Application Data

(63) Continuation of application No. PCT/JP2015/069540, filed on Jul. 7, 2015.

(30) Foreign Application Priority Data

Aug. 28, 2014 (JP) ................................. 2014-173858

(51) Int. Cl.
| | |
|---|---|
| B32B 27/20 | (2006.01) |
| B32B 27/00 | (2006.01) |
| G06F 3/044 | (2006.01) |
| B32B 27/06 | (2006.01) |
| G02F 1/1333 | (2006.01) |
| G06F 3/041 | (2006.01) |
| B32B 7/06 | (2006.01) |
| B32B 23/20 | (2006.01) |
| B32B 27/08 | (2006.01) |
| B32B 27/28 | (2006.01) |
| B32B 27/32 | (2006.01) |
| B32B 27/36 | (2006.01) |
| B32B 3/26 | (2006.01) |

(52) U.S. Cl.
CPC .............. *B32B 27/20* (2013.01); *B32B 3/263* (2013.01); *B32B 3/266* (2013.01); *B32B 7/06* (2013.01); *B32B 23/20* (2013.01); *B32B 27/00* (2013.01); *B32B 27/06* (2013.01); *B32B 27/08* (2013.01); *B32B 27/283* (2013.01); *B32B 27/325* (2013.01); *B32B 27/36* (2013.01); *B32B 27/365* (2013.01); *G02F 1/13338* (2013.01); *G06F 3/044* (2013.01); *G06F 3/0412* (2013.01); *B32B 2250/44* (2013.01); *B32B 2264/102* (2013.01); *B32B 2264/108* (2013.01); *B32B 2307/202* (2013.01); *B32B 2307/306* (2013.01); *B32B 2307/40* (2013.01); *B32B 2307/402* (2013.01); *B32B 2307/4026* (2013.01); *B32B 2307/584* (2013.01); *B32B 2307/748* (2013.01); *B32B 2451/00* (2013.01); *B32B 2457/20* (2013.01); *B32B 2457/208* (2013.01); *G06F 2203/04103* (2013.01); *G06F 2203/04107* (2013.01)

(58) Field of Classification Search
CPC ....................................................... C08G 77/44
See application file for complete search history.

(56) References Cited

U.S. PATENT DOCUMENTS

| | | | | |
|---|---|---|---|---|
| 4,225,516 A | * | 9/1980 | Biola ..................... | C07C 323/00 568/41 |
| 2002/0077383 A1 | * | 6/2002 | Takao et al. ........... | C09D 11/00 523/160 |
| 2004/0241126 A1 | * | 12/2004 | Sakuta ..................... | A61K 7/32 424/70.12 |
| 2006/0066802 A1 | * | 3/2006 | Kitayama ............... | G02F 1/167 349/156 |
| 2014/0340364 A1 | * | 11/2014 | Tang et al. .............. | G06F 3/042 345/175 |

(Continued)

FOREIGN PATENT DOCUMENTS

JP    2014-24316 A    2/2014

OTHER PUBLICATIONS

Machine translation of JP 2014-139770 (no date).*

(Continued)

*Primary Examiner* — Marc S Zimmer
(74) *Attorney, Agent, or Firm* — Birch, Stewart, Kolasch & Birch, LLP

(57) ABSTRACT

A substrate with a decorative material includes a substrate, a white colored layer, and a light shielding layer in this order, and the light shielding layer contains a black pigment and a graft type silicone polymer. It is preferable that the graft type silicone polymer is a compound represented by Formula 1 described below.

(1)

$$R^2-\underset{R^3}{\overset{R^1}{\text{Si}}}-O-\left[\underset{R^5}{\overset{R^4}{\text{Si}}}-O\right]_l-\left[\underset{\underset{\underset{A}{R^{13}}}{\overset{|}{S}}}{\overset{R^6}{\text{Si}}}-O\right]_m-\left[\underset{\underset{\underset{B}{R^{14}}}{\overset{|}{S}}}{\overset{R^7}{\text{Si}}}-O\right]_n-\underset{R^{10}}{\overset{R^8}{\text{Si}}}-R^9$$

11 Claims, 7 Drawing Sheets

(56) References Cited

U.S. PATENT DOCUMENTS

2015/0092123 A1    4/2015  Gotoh et al.
2017/0003593 A1*  1/2017  Yoshinari ................ G03F 7/038

OTHER PUBLICATIONS

International Search Report for PCT/JP2015/069540 (PCT/ISA/210) dated Oct. 13, 2015.
Written Opinion of the International Searching Authority for PCT/JP2015/069540 (PCT/ISA/237) dated Oct. 13, 2015.
Japanese Office Action dated Sep. 5, 2017 for corresponding Japanese Application No. 2016-545032, with English translation.
English translation of Written Opinion of the International Searching Authority and International Preliminary Report on Patentability for PCT/JP2015/069540 (PCT/ISA/237 and PCT/IB/373) dated Oct. 13, 2015.

* cited by examiner

SUBSTRATE WITH DECORATIVE MATERIAL, TRANSFER MATERIAL FOR FORMING DECORATIVE LAYER, TOUCH PANEL, AND INFORMATION DISPLAY DEVICE

CROSS-REFERENCE TO RELATED APPLICATIONS

This application is a Continuation of PCT International Application No. PCT/JP2015/69540, filed on Jul. 7, 2015, which claims priority under 35 U.S.C. § 119(a) to Japanese Patent Application No. 2014-173858, filed on Aug. 28, 2014. Each of the above application(s) is hereby expressly incorporated by reference, in its entirety, into the present application.

BACKGROUND OF THE INVENTION

1. Field of the Invention

The present invention relates to a substrate with a decorative material, a transfer material for forming a decorative layer, a touch panel, and an information display device.

2. Description of the Related Art

In an electronic device such as a mobile phone, a car navigation system, a personal computer, a ticket vending machine, and a banking terminal, recently, a touch panel type input device has been disposed on the surface of a liquid crystal device or the like. A finger, a touch pen, or the like is brought into contact with a portion in which an instruction image is displayed while referring to the instruction image displayed on an image display region of the liquid crystal device, and thus, information corresponding to the instruction image is input.

Such an input device (a touch panel) includes a resistive film type input device, a capacitance type input device, and the like. The capacitance type input device has an advantage in which a light transmissive conductive film may be simply formed on one substrate. In addition, the capacitance type input device has an advantage in which a light transmissive conductive film may be formed on one substrate. In a capacitance type touch panel of a cover glass integrated type (one glass solution: OGS) touch panel, a front plate is integrated with a capacitance type input device, and thus, a reduction in a thickness and a weight can be attained.

Such a capacitance type input device is decorated to make a drawing circuit or the like of a display device invisible to a user and to make the visual quality excellent by forming a decorative material into the shape of a frame surrounding an information display portion (also referred to as an image display portion and a light transmissive region) which is in contact with a finger, a touch pen, or the like. A white decorative material is required as a decorative material for performing such decoration from the viewpoint of design or visual quality. In addition, the drawing circuit or the like of the display device may be seen by the user through with only the white decorative material. Therefore, in order to make the drawing circuit or the like invisible, a black decorative material (also referred to as a light shielding layer) or a decorative material colored with other colors is required to be used.

When a colored decorative material such as a white decorative material is manufactured, in general, a method using a pigment dispersion liquid is known. In order to increase the dispersibility of the pigment, a polymer compound may be added to the pigment dispersion liquid as a pigment dispersant.

In addition, in JP2014-24316A, a transfer film including a temporary support and a colored layer is disclosed, in which the colored layer contains at least (A) white inorganic pigment and (B) silicone-based resin.

SUMMARY OF THE INVENTION

In a substrate with a decorative material including a white colored layer and a light shielding layer on a substrate in this order, a white layer of a substrate with a decorative material of the related art is colored at the time of preparing a capacitance type input device on a decorative material such as formation of a light transmissive conductive film. In particular, the coloration occurs through a heating step.

An object of the present invention is to provide a substrate with a decorative material in which coloration of a white layer is suppressed, a transfer material for forming a decorative layer, a touch panel including the substrate with a decorative material, and an information display device including the touch panel.

The object of the present invention is attained by the following means of <1>, <9>, <11>, or <12>. The means of <1>, <9>, <11>, or <12> will be described below along with <2> to <8>, and <10> which are preferred embodiments.

<1> A substrate with a decorative material, comprising: a substrate; a white colored layer; and a light shielding layer in this order, in which the light shielding layer contains a black pigment and a graft type silicone polymer.

<2> The substrate with a decorative material according to <1>, in which the graft type silicone polymer is a compound represented by Formula 1 described below.

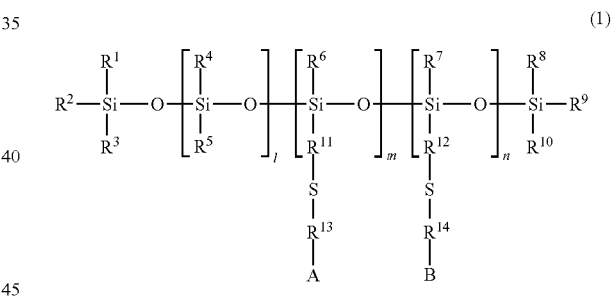

(1)

In Formula 1, $R^1$ to $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, $R^{13}$ and $R^{14}$ each independently represent a single bond or a divalent organic linking group, $A^1$ represents a group having a pigment adsorption site, B represents a group having a structure represented by Formula 2 described below, l and n each independently represent an integer of greater than or equal to 1, and m represents an integer of greater than or equal to 0.

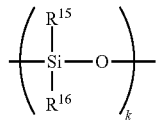

(2)

In Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

<3> The substrate with a decorative material according to <2>, in which in Formula 1, m represents an integer of greater than or equal to 1.

<4> The substrate with a decorative material according to any one of <1> to <3>, in which the graft type silicone polymer is a compound represented by Formula 3 described below.

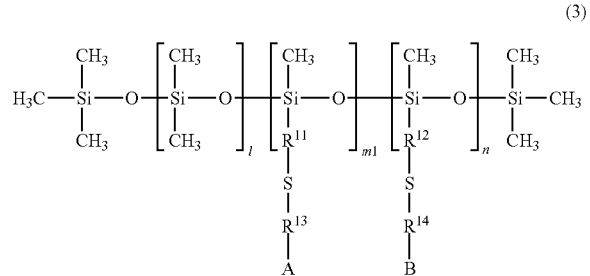

(3)

In Formula 3, $R^{11}$ and $R^{12}$ each independently represent an arylene group or an alkylene group having 1 to 3 carbon atoms, $R^{13}$ and $R^{14}$ each independently represent a single bond or a divalent organic linking group, $A^1$ represents a group having a pigment adsorption site which has at least one group selected from the group consisting of an acidic group, a group having a basic nitrogen atom, a urea group, a urethane group, a group having a coordinating oxygen atom, a hydrocarbon group having greater than or equal to 4 carbon atoms, a heterocyclic group, an amido group, an alkoxy silyl group, an epoxy group, an isocyanato group, a hydroxy group, and a thiol group, B represents a group having a structure represented by Formula 2 described below, and l, m1, and n each independently represent an integer of greater than or equal to 1.

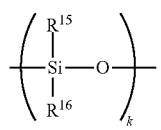

(2)

In Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

<5> The substrate with a decorative material according to any one of <1> to <4>, in which the white colored layer contains titanium dioxide.

<6> The substrate with a decorative material according to any one of <1> to <5>, in which the black pigment is carbon black.

<7> The substrate with a decorative material according to any one of <1> to <6>, in which the white colored layer contains a graft type silicone polymer.

<8> The substrate with a decorative material according to <7>, in which the graft type silicone polymer contained in the white colored layer is a compound represented by Formula 1 described below.

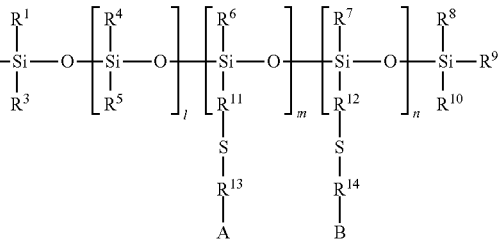

(1)

In Formula 1, $R^1$ to $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, $R^{13}$ and $R^{14}$ each independently represent a single bond or a divalent organic linking group, A represents a group having a pigment adsorption site, B represents a group having a structure represented by Formula 2 described below, l and n each independently represent an integer of greater than or equal to 1, and m represents an integer of greater than or equal to 0.

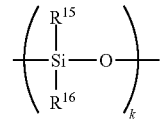

(2)

In Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

<9> A transfer material for forming a decorative layer, comprising: a temporary support; a white colored layer; and a light shielding layer, in which the light shielding layer contains a black pigment and a graft type silicone polymer.

<10> The transfer material for forming a decorative layer according to <9>, in which the graft type silicone polymer is a compound represented by Formula 1 described below.

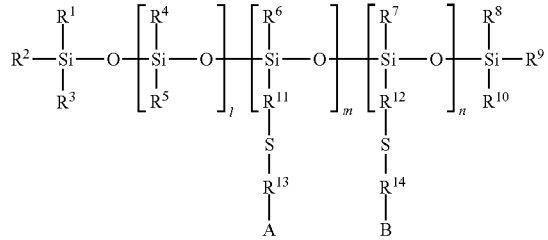

(1)

In Formula 1, $R^1$ to $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, $R^{13}$ and $R^{14}$ each independently represent a single bond or a divalent organic linking group, A represents a group having a pigment adsorption site, B represents a group having a structure represented by Formula 2 described below, l and n each independently represent an integer of greater than or equal to 1, and m represents an integer of greater than or equal to 0.

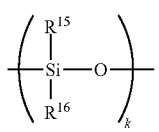

(2)

In Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

<11> A touch panel, comprising: the substrate with a decorative material according to any one of <1> to <8>.

<12> An information display device, comprising: the touch panel according to <11>.

According to the present invention, it is possible to provide a substrate with a decorative material in which discoloration of a white layer is suppressed, a transfer material for forming a decorative layer, a touch panel including the substrate with a decorative material, and an information display device including the touch panel.

DESCRIPTION OF THE PREFERRED EMBODIMENTS

Figure 1:
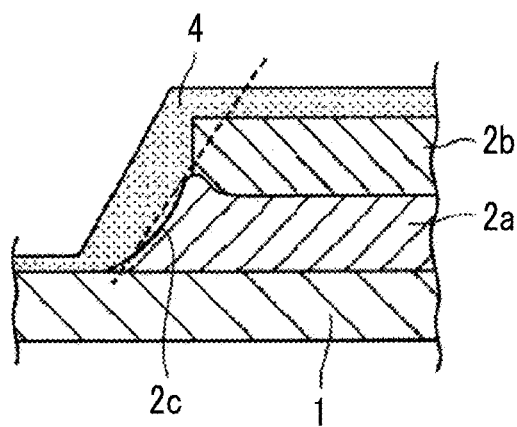
FIG. 1 is a partially enlarged sectional view illustrating an example of a decorative material.

Hereinafter, the contents of the present invention will be described in detail. The following description of constituents is based on representative embodiments of the present invention, but the present invention is not limited to the embodiments. Furthermore, in this specification, a numerical range represented by using "to" indicates a range including numerical values before and after "to" as the lower limit value and the upper limit value.

In this specification, in the description of a group (an atom group), the description without a note of "substitutional" and "non-substitutional" includes a group having a substituent along with a group not having a substituent. For example, an "alkyl group" includes not only an alkyl group not having a substituent (a non-substitutional alkyl group) but also an alkyl group having an substituent (a substitutional alkyl group).

Furthermore, in this specification, "(meth)acrylate" indicates acrylate and methacrylate, "(meth)acryl" indicates acryl and methacryl, and "(meth)acryloyl" indicates acryloyl and methacryloyl.

In addition, in the present invention, "mass %" is synonymous with "weight %", and "parts by mass" is synonymous with "parts by weight".

In addition, in the present invention, a combination of preferred embodiments is a more preferred embodiment.

In the present invention, a molecular weight of a polymer component is a weight-average molecular weight in terms of polystyrene which is measured by a gel permeation chromatography (GPC) in a case where tetrahydrofuran (THF) is used as a solvent. Specifically, the weight-average molecular weight can be measured in the following conditions.

Column: GPC Column TSKgelSuper HZM-H (manufactured by TOSOH CORPORATION)
Solvent: Tetrahydrofuran
Standard Substance: Monodispersed Polystyrene 1. Substrate with Decorative Material A substrate with a decorative material of the present invention includes a substrate, a white colored layer, and a light shielding layer in this order, and the light shielding layer contains a black pigment and a graft type silicone polymer.

In the substrate with a decorative material including the white colored layer, a discoloration (coloration) of the white colored layer occurs due to a heat treatment or the like. As a result of intensive studies of the present inventors, it has found that the light shielding layer adjacent to the white colored layer contains the graft type silicone polymer, and thus, the discoloration (the coloration) of the white colored layer is suppressed, and thus, the present invention has been completed.

The specific functional mechanism thereof is not apparent, but is assumed as described below. That is, it is considered that in a case where a polymer dispersant of the related art is used as a dispersant of a black pigment in the light shielding layer adjacent to the white colored layer, a part of the polymer dispersant is moved to the white colored layer. It is considered that when the substrate with a decorative material is subjected to a heat treatment, the polymer dispersant which has been moved to the white colored layer is colored, and as a result thereof, the discoloration of the white colored layer occurs. It is considered that in the present invention, the graft type silicone polymer is used in the light shielding layer as the dispersant of the black pigment, and thus, in a case where a part of the dispersant is moved to the white colored layer, the coloration is suppressed, and as a result thereof, the discoloration of the white colored layer is suppressed. It is preferable that the light shielding layer does not contain a resin which is thermally discolored by heating, such as an acrylic resin, an epoxy resin, and a urethane resin.

The substrate with a decorative material of the present invention includes the substrate, the white colored layer, and the light shielding layer. In this embodiment, the white colored layer and the light shielding layer configure a decorative material.

In addition, it is preferable that the substrate with a decorative material of the present invention further includes a conductive layer.

The substrate with a decorative material of the present invention includes the substrate, the white colored layer, and the light shielding layer in this order, and is preferably a substrate with a decorative material including the substrate, the white colored layer, the light shielding layer, and the conductive layer in this order.

The substrate with a decorative material of the present invention includes the substrate, the white colored layer, and the light shielding layer in this order, the substrate with a decorative material includes a light transmissive region transmitting light in a thickness direction, the white colored layer and the light shielding layer are laminated on the substrate to surround the light transmissive region, and it is preferable that a tilt portion formed such that the thickness of the decorative material towards the inside of the light transmissive region becomes thin is included in an inner edge of the decorative material, and it is more preferable that a tilt angle between the surface of the tilt portion and the surface of the substrate is 10 to 60 degrees. The decorative material includes the tilt portion, and the tilt angle between the surface of the tilt portion and the surface of the substrate is set to be 10 to 60 degrees, and thus, a film thickness difference between the decorative material and a portion of the substrate in which the decorative material is not formed is relaxed, and a problem such as disconnection rarely occurs in the conductive layer on the light shielding layer.

Hereinafter, a preferred embodiment of the substrate with a decorative material of the present invention will be described.

In a region where the decorative material is formed, an optical density of the substrate with a decorative material of the present invention is preferably 3.5 to 6.0, is more preferably 4.0 to 5.5, and is particularly preferably 4.5 to 5.0.

In the region where the decorative material is formed, in the tint of the substrate with a decorative material of the present invention on the substrate side, an L* value is preferably greater than or equal to 89, is more preferably greater than or equal to 90, and is particularly preferably greater than or equal to 91, in an SCI index. Further, in the substrate with a decorative material of the present invention, it is preferable that the L* value of the substrate with a decorative material on the substrate side after being subjected to a high temperature treatment at 280° C. for 40 minutes is in the range described above in the SCI index from the viewpoint of improving the tint after performing vapor deposition with respect to the conductive layer on the light shielding layer by sputtering.

In the region where the decorative material is formed, in the tint of the substrate with a decorative material of the present invention, in substrate side, a b* value is preferably less than 1.0, is more preferably less than or equal to 0.5, and is particularly preferably less than or equal to 0.0, in an SCI index. Further, in the substrate with a decorative material of the present invention, it is preferable that the b* value of the substrate with a decorative material on the substrate side after being subjected to a high temperature treatment at 280° C. for 40 minutes is in the range described above in the SCI index from the viewpoint of improving the tint after performing vapor deposition with respect to the conductive layer on the light shielding layer by sputtering.

A preferred embodiment of the decorative material of the present invention is a pattern in the shape of a frame around the light transmissive region (a display region) formed on a front plate of a touch panel on a non-contact side, and is formed in order to make drawing wiring or the like invisible or to perform decoration. As illustrated in examples of FIG. 1 to FIG. 3, it is preferable that a tilt portion 2c formed such that the thickness of the decorative material becomes thin towards the inside of the light transmissive region is included in the inner edge of the decorative material which is a laminate of a white colored layer 2a and a light shielding layer 2b which are disposed on a substrate 1. It is preferable that a conductive layer 4 is formed on the decorative material, and extends on the substrate 1 according to the tilt portion 2c of the decorative material.

By disposing the tilt portion, a film thickness difference between the decorative material and a portion of the substrate in which the decorative material is not formed is relaxed, or a problem such as disconnection rarely occurs in the conductive layer.

A formation method of the tilt portion is not particularly limited, and examples of the formation method include a method of forming the tilt portion by contracting the light shielding layer with heating, a method of forming the tilt portion by melting a layer formed of a thermosetting resin composition of the present invention or a layer formed by drying the thermosetting resin composition of the present invention (hereinafter, also referred to as an "uncured layer") with heating, and the like, and the method of forming the tilt portion by contracting the light shielding layer with heating is preferable. By contracting a light shielding layer with heating, the uncured layer on the light shielding layer side is also contracted along with the light shielding layer, but the uncured layer on the substrate side is not contracted along with the light shielding layer, and thus, it is possible to form the tilt portion. Forming the tilt portion by contracting the light shielding layer with heating will be described below.

Figure 2:
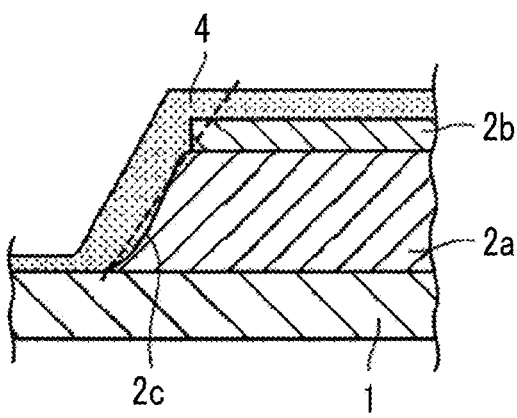
FIG. 2 is a partially enlarged sectional view illustrating another example of the decorative material.
Figure 3:
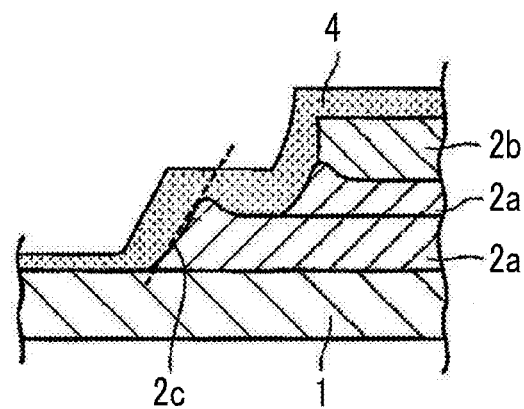
FIG. 3 is a partially enlarged sectional view illustrating still another example of the decorative material.

The shape of the tilt portion 2c in the decorative material is not particularly limited, and may have a protruding projection as illustrated in the example of FIG. 1 and FIG. 3 or may have a shape formed of a smooth curve as illustrated in the example of FIG. 2. In addition, as illustrated in FIG. 1 to FIG. 3, the tilt portion 2c may be formed such that the thickness of the white colored layer 2a becomes thin towards the inside of the light transmissive region, or may be formed such that the thickness of the light shielding layer 2b also becomes thin towards the inside of the light transmissive region along with the white colored layer 2a. As illustrated in the example of FIG. 3, the white colored layer 2a may be in an embodiment in which two or more layers are laminated.

Figure 4:
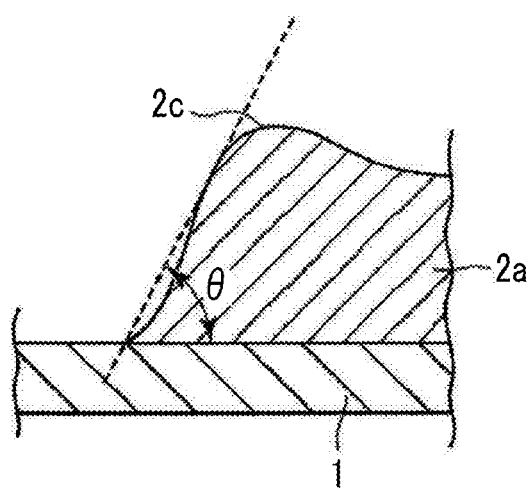
FIG. 4 is a partially enlarged sectional view illustrating a tilt angle between a tilt portion and a substrate.

A tilt angle θ between the surface of the tilt portion and the surface of the substrate illustrated in FIG. 4 is 10 to 60 degrees, and is more preferably 15 to 55 degrees. In a case where the tilt angle θ is greater than or equal to 10 degrees, a portion in which the light shielding layer is not provided on the white colored layer decreases, abnormal appearance, that is, a region having a low optical density decreases, and a light leakage of a display device or a case where a beam of a circuit is visible decrease. On the other hand, in a case where the tilt angle θ is less than or equal to 60 degrees, a problem such as disconnection rarely occurs in the conductive layer.

As illustrated by a dotted line in FIGS. 1 to 4, the tilt angle θ is a tilt angle between a flat surface to which the surface of the tilt portion is approximated and the surface of the substrate. The tilt angle θ can be obtained by cutting the substrate, and by measuring an angle between the substrate and the surface of the tilt portion from a sectional direction by using an optical microscope.

In a case where the tilt portion is formed by contracting the light shielding layer with heating, it is possible to form the tilt portion having a desired tilt angle by changing the type and/or the composition of resins configuring the white colored layer and/or the light shielding layer.

In the present invention, it is preferable that the tilt angle θ is set such that a difference between the width of the white colored layer on the substrate side and the width of the light shielding layer becomes less than or equal to 200 μm. According to such a configuration, it is possible to solve the problem such as abnormal appearance and disconnection of the conductive layer.

The difference between the width of the white colored layer on the substrate side and the width of the light shielding layer (a difference in edges) is preferably less than or equal to 200 μm, is more preferably 5 to 100 μm, and is even more preferably 10 to 90 μm.

The width of the white colored layer on the substrate side indicates the width of the decorative material on a side in contact with the substrate in the white colored layer.

(Substrate)

Various substrates can be used as the substrate used in the substrate with a decorative material of the present invention, a film substrate is preferable, and a substrate having no optical distortion or a substrate having a high transparency is more preferable. In the substrate with a decorative material of the present invention, it is preferable that the total light transmittance of the substrate is greater than or equal to 80%.

Examples of a specific material in a case where the substrate is the film substrate can include polyethylene terephthalate (PET), polyethylene naphthalate, polycarbonate (PC), triacetyl cellulose (TAC), and a cycloolefin polymer (COP).

In addition, the substrate may be glass or the like.

In the substrate with a decorative material of the present invention, it is preferable that the substrate is selected from glass, TAC, PET, PC, COP, or a silicone resin (here, a silicone resin or polyorganosiloxane in this specification is not limited to the narrow sense represented by a constitutional unit of $R_2SiO$, but also includes a silsesquioxane compound represented by a constitutional unit of $RSiO_{1.5}$), and it is preferable that the substrate is formed of glass, a cycloolefin polymer, or a silicone resin.

It is preferable that the silicone resin contains basket type polyorganosiloxane as a main component, and it is more preferable that the silicone resin contains basket type silsesquioxane as a main component. Furthermore, the main component of the composition or the layer indicates a component occupying greater than or equal to 50 mass % of the composition or the layer.

Substrates containing a silicone resin described in each publication of JP4142385B, JP4409397B, JP5078269B, JP4920513B, JP4964748B, JP5036060B, JP2010-96848A, JP2011-194647A, JP2012-183818A, JP2012-184371A, and JP2012-218322A can be used as the substrate containing the silicone resin, and the contents thereof are incorporated in the present invention.

In addition, various functions may be added to the surface of the substrate. Specifically, an antireflection layer, an antiglare layer, a phase difference layer, a viewing angle enhancing layer, a protective layer, a self-restoring layer, an antistatic layer, an antifouling layer, an antielectromagnetic wave layer, and a conductive layer can be included.

In the substrate with a decorative material of the present invention, it is preferable that the substrate includes the conductive layer on the surface of the substrate. A conductive layer described in JP2009-505358A is preferably used as the conductive layer.

In addition, it is preferable that the substrate includes at least one of an antiscratch layer or an antiglare layer.

In the substrate with a decorative material of the present invention, a film thickness of the substrate is preferably 35 to 200 μm, is more preferably 40 to 150 μm, and is particularly preferably 40 to 100 μm.

In addition, in a case where the decorative material is used in a transfer material, in order to increase adhesiveness of the decorative material, a non-contact surface of the substrate (the front plate) can be subjected to a surface treatment in advance. It is preferable that a surface treatment (a silane coupling treatment) using a silane compound is performed as the surface treatment. As the surface treatment using the silane compound, for example, a silane coupling liquid (an aqueous solution of N-β(aminoethyl)γ-aminopropyl trimethoxy silane of 0.3 mass %, Product Name: KBM603, manufactured by Shin-Etsu Chemical Co., Ltd.) is sprayed by shower for 20 seconds, and pure water shower washing is performed. After that, a reaction is performed by heating. A heating tank may be used, and the reaction can be accelerated by preheating a substrate of a laminator.

(Light Shielding Layer)

The substrate with a decorative material of the present invention includes the light shielding layer on the surface on a side opposite to the white colored layer. It is preferable that the light shielding layer is disposed to be adjacent to the white colored layer, and an adhesive layer or the like may be disposed between the white colored layer and the light shielding layer.

In the following description, a composition for forming the light shielding layer will also be referred to as a composition for forming a light shielding layer.

The light shielding layer contains at least the black pigment and the graft type silicone polymer. That is, the composition for forming a light shielding layer contains the black pigment and the graft type silicone polymer.

<Black Pigment>

Examples of the black pigment include carbon black, titanium black, titanium carbon, iron oxide, titanium oxide, black lead, and the like, and in the substrate with a decorative material of the present invention, it is preferable that the light shielding layer contains at least one of the titanium oxide or the carbon black, and it is more preferable that the light shielding layer contains the carbon black.

The content of the black pigment is preferably 3 to 60 mass %, is more preferably 5 to 45 mass %, and is even more preferably 10 to 30 mass %, with respect to the total solid content of the composition for forming a light shielding layer. Furthermore, the "total solid content" indicates a component obtained by removing a volatile component such as a solvent from the composition for forming a light shielding layer.

In the black pigment used in the present invention, the average particle diameter of primary particles is preferably 5 to 100 nm, and is more preferably 10 to 50 nm, from the viewpoint of dispersion stability and covering power. In a case where the average particle diameter of the primary particles is greater than or equal to 5 nm, covering power is high, and thus, a base substrate of the light shielding layer is rarely visible, and a viscosity rarely increases. On the other hand, in a case where the average particle diameter of the primary particles is less than or equal to 100 nm, a chromaticity is sufficiently high and covering power is also high, and a surface shape at the time of performing coating is excellent.

Furthermore, here, the "average particle diameter of the primary particles" indicates a diameter at the time of setting an electron micrographic image of the particles to a circle of the same area, and a "number average particle diameter" indicates the average value of 100 particle diameters described above of a plurality of particles.

<Graft Type Silicone Polymer>

In the present invention, the light shielding layer contains the graft type silicone polymer. It is preferable that the composition for forming a light shielding layer contains the graft type silicone polymer.

It is preferable that the graft type silicone polymer has a function as the dispersant of the black pigment, and it is more preferable that the graft type silicone polymer is a compound represented by Formula 1 described below.

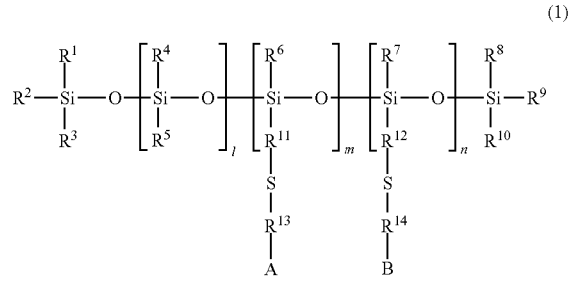

(1)

In Formula 1, $R^1$ to $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, $R^{13}$ and $R^{14}$ each independently represent a single bond or a divalent organic linking group, A represents a group having a pigment adsorption site, B represents a group having a structure represented by Formula 2 described below, l and n each independently represent an integer of greater than or equal to 1, and m represents an integer of greater than or equal to 0.

(2)

In Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

In Formula 1, $R^1$ to $R^{10}$ each independently represent a hydrogen atom, a hydroxy group, an aryl group, or an alkyl group having 1 to 3 carbon atoms, and the aryl group or the alkyl group having 1 to 3 carbon atoms is preferable, and the alkyl group having 1 to 3 carbon atoms is more preferable.

Examples of the aryl group of $R^1$ to $R^{10}$ can include a phenyl group or a substitutional phenyl group.

Examples of the alkyl group having 1 to 3 carbon atoms of $R^1$ to $R^{10}$ can include a methyl group, an ethyl group, an n-propyl group, and an i-propyl group, and the methyl group and the ethyl group are preferable, and the methyl group is more preferable.

$R^1$ to $R^{10}$ may further have a substituent. For example, in a case where $R^1$ to $R^{10}$ represents the hydroxy group, an alkoxy group may be formed by further having an arbitrary alkyl group as a substituent. Here, it is preferable that $R^1$ to $R^{10}$ do not further have a substituent.

In a case where l is greater than or equal to 2, l $R^4$'s and l $R^5$'s may be identical to each other, or may be different from each other.

In a case where m is greater than or equal to 2, m $R^6$'s may be identical to each other, or may be different from each other.

In a case where n is greater than or equal to 2, n $R^7$'s may be identical to each other, or may be different from each other.

In Formula 1, $R^{11}$ and $R^{12}$ each independently represent an arylene group or an alkylene group having 1 to 3 carbon atoms, and the alkylene group having 1 to 3 carbon atoms is preferable.

In a case where m is greater than or equal to 2, m $R^{11}$'s may be identical to each other, or may be different from each other.

In a case where n is greater than or equal to 2, n $R^{12}$'s may be identical to each other, or may be different from each other.

In Formula 1, $R^{13}$ represents a single bond or a divalent organic linking group.

In a case where m is greater than or equal to 2, m $R^{13}$'s may be identical to each other, or may be different from each other.

In Formula 1, $R^{14}$ represents a single bond or a divalent organic linking group.

In a case where n is greater than or equal to 2, n $R^{13}$'s may be identical to each other, or may be different from each other.

Examples of the divalent organic linking group of $R^{13}$ or $R^{14}$ include a group formed of 1 to 100 carbon atoms, 0 to 10 nitrogen atoms, 0 to 50 oxygen atoms, 1 to 200 hydrogen atoms, and 0 to 20 sulfur atoms, and the divalent organic linking group may not be substituted or may further have a substituent.

Specific examples of the divalent organic linking group of $R^{13}$ or $R^{14}$ can include a group configured of structural units selected from a structural unit group G described below or a combination of the structural units.

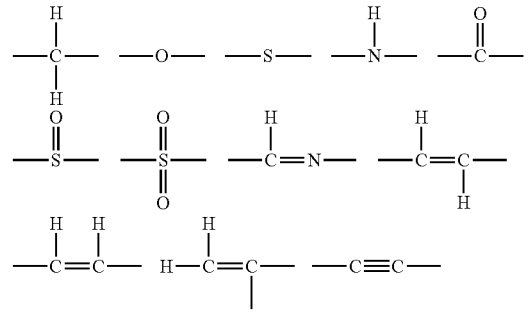

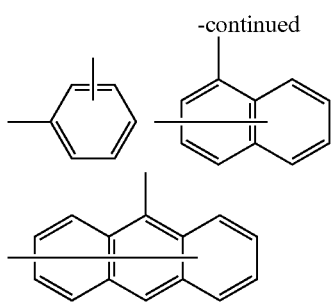

A single bond or a divalent organic linking group formed of 1 to 50 carbon atoms, 0 to 8 nitrogen atoms, 0 to 25 oxygen atoms, 1 to 100 hydrogen atoms, and 0 to 10 sulfur atoms is preferable as $R^{13}$ or $R^{14}$, the single bond or a divalent organic linking group formed of 1 to 30 carbon atoms, 0 to 6 nitrogen atoms, 0 to 15 oxygen atoms, 1 to 50 hydrogen atoms, and 0 to 7 sulfur atoms is more preferable, and the single bond or a divalent organic linking group formed of 1 to 10 carbon atoms, 0 to 5 nitrogen atoms, 0 to 10 oxygen atoms, 1 to 30 hydrogen atoms, and 0 to 5 sulfur atoms is particularly preferable.

It is preferable that $R^{13}$ or $R^{14}$ is a single bond or a divalent organic linking group formed of "1 to 10 carbon atoms, 0 to 5 nitrogen atoms, 0 to 10 oxygen atoms, 1 to 30 hydrogen atoms, and 0 to 5 sulfur atoms" which is configured of a structural unit selected from the structural unit group G described above or a combination of the structural units (the divalent organic linking group may have a substituent, and example of the substituent include an alkyl group having 1 to 20 carbon atoms such as a methyl group and an ethyl group, an aryl group having 6 to 16 carbon atoms such as a phenyl group and a naphthyl group, an acyloxy group having 1 to 6 carbon atoms such as a hydroxyl group, an amino group, a carboxyl group, a sulfone amido group, an N-sulfonyl amido group, and an acetoxy group, an alkoxy group having 1 to 6 carbon atoms such as a methoxy group and an ethoxy group, a halogen atom such as chlorine and bromine, an alkoxy carbonyl group having 2 to 7 carbon atoms such as a methoxy carbonyl group, an ethoxy carbonyl group, and a cyclohexyloxy carbonyl group, a carbonic acid ester group such as a cyano group and a t-butyl carbonate, and the like).

It is preferable that $R^{13}$ is a divalent organic linking group represented by —($CH_2$)—CH($R^{13A}$)—. $R^{13A}$ represents a hydrogen atom or an alkyl group having 1 to 3 carbon atoms, and the hydrogen atom or a methyl group is more preferable. $R^{13A}$ may further have a substituent, and in a case where $R^{13A}$ has a substituent, a carboxyl group is preferable as the substituent.

It is preferable that $R^{14}$ is a divalent organic linking group represented by —($CH_2$)—CH($R^{14A}$)—C(=O)—O—($C_qH_{2q}$)—. $R^{14A}$ represents a hydrogen atom or an alkyl group having 1 to 3 carbon atoms, and the hydrogen atom or a methyl group is preferable. $R^{14A}$ may further have a substituent. q represents an integer of greater than or equal to 0, and an integer of greater than or equal to 1 is preferable.

In Formula 1, A represents a group having a pigment adsorption site.

In a case where m is greater than or equal to 2, m A's may be identical to each other, or may be different from each other.

A may have one pigment adsorption site, or may have a plurality of pigment adsorption sites. In a case where A has a plurality of pigment adsorption sites, the plurality of pigment adsorption sites may be identical to each other or different from each other.

It is preferable that A, for example, is a monovalent organic group formed by bonding a pigment adsorption site to an organic linking group configured of 1 to 200 carbon atoms, 0 to 20 nitrogen atoms, 0 to 100 oxygen atoms, 1 to 400 hydrogen atoms, and 0 to 40 sulfur atoms. In a case where the pigment adsorption site itself can configure the monovalent organic group, it is natural that the pigment adsorption site itself may be an organic group represented by A.

It is preferable that the pigment adsorption site described above contains at least one group selected from the group consisting of an acidic group, a group having a basic nitrogen atom, a urea group, a urethane group, a group having a coordinating oxygen atom, a hydrocarbon group having greater than or equal to 4 carbon atoms, a heterocyclic residue group, an amido group, an alkoxy silyl group, an epoxy group, an isocyanate group, a hydroxy group, and a thiol group, it is more preferable that the pigment adsorption site contains at least one group selected from the group consisting of an acidic group, a group having a basic nitrogen atom, a urea group, a group having a coordinating oxygen atom, a heterocyclic residue group, an amido group, an alkoxy silyl group, a hydroxy group, and a thiol group, it is even more preferable that the pigment adsorption site contains at least one group selected from the group consisting of an acidic group and an alkoxy silyl group, and it is particularly preferable that the pigment adsorption site is a carboxylic acid group, a phosphoric acid group, or a trimethoxy silyl group.

Examples of the acidic group of the pigment adsorption site preferably include a carboxylic acid group, a sulfonic acid group, a monosulfuric acid ester group, a phosphoric acid group (a phosphono group or the like), a phosphonooxy group, a monophosphoric acid ester group, and a boric acid group, more preferably include a carboxylic acid group, a sulfonic acid group, a monosulfuric acid ester group, a phosphoric acid group, a phosphonooxy group, and a monophosphoric acid ester group, and particularly preferably include a carboxylic acid group, a sulfonic acid group, and a phosphoric acid group.

Examples of the group having a basic nitrogen atom of the pigment adsorption site include an amino group (—$NH_2$), a substitutional imino group (—$NHR^{C1}$ and —$NR^{C2}R^{C3}$, here, $R^{C1}$, $R^{C2}$, and $R^{C3}$ each independently represent an alkyl group having 1 to 20 carbon atoms, an aryl group having greater than or equal to 6 carbon atoms, or an aralkyl group having greater than or equal to 7 carbon atoms), a guanidyl group, an amidinyl group, or the like.

Examples of the urea group of the pigment adsorption site include —$NR^{C4}CONR^{C5}R^{C6}$ (here, $R^{C4}$ to $R^{C6}$ each independently represent a hydrogen atom, an alkyl group having 1 to 20 carbon atoms, an aryl group having greater than or equal to 6 carbon atoms, or an aralkyl group having greater than or equal to 7 carbon atoms), —$NR^{C4}CONHR^{C6}$ (here, $R^{C4}$ and $R^{C6}$ each independently represent a hydrogen atom, an alkyl group having 1 to 10 carbon atoms, an aryl group having greater than or equal to 6 carbon atoms, or an aralkyl group having greater than or equal to 7 carbon atoms) is more preferable, —$NHCONHR^{C6}$ (here, $R^{C6}$ represents a hydrogen atom, an alkyl group having 1 to 10 carbon atoms, an aryl group having greater than or equal to 6 carbon atoms, or an aralkyl group having greater than or equal to 7 carbon atoms) is particularly preferable.

Examples of the urethane group of the pigment adsorption site include —NHCOOR$^{C7}$, —NR$^{C8}$COOR$^{C9}$, —OCONHRC$^{10}$, —OCONR$^{C11}$R$^{C12}$ (here, R$^{C7}$ to R$^{C12}$ each independently represent an alkyl group having 1 to 20 carbon atoms, an aryl group having greater than or equal to 6 carbon atoms, or an aralkyl group having greater than or equal to 7 carbon atoms), and the like, —NHCOOR$^{C7}$ and —OCONHR$^{C10}$ (here, R$^{C7}$ and R$^{C10}$ each independently represent an alkyl group having 1 to 20 carbon atoms, an aryl group having greater than or equal to 6 carbon atoms, or an aralkyl group having greater than or equal to 7 carbon atoms) are more preferable, and —NHCOOR$^{C7}$ and —OCONHR$^{C10}$ (here, R$^{C7}$ and R$^{C10}$ each independently represent an alkyl group having 1 to 10 carbon atoms, an aryl group having greater than or equal to 6 carbon atoms, or an aralkyl group having greater than or equal to 7 carbon atoms) are particularly preferable.

Examples of the group having a coordinating oxygen atom of the pigment adsorption site include an acetyl acetonate group, crown ether, and the like.

Examples of the hydrocarbon group having greater than or equal to 4 carbon atoms of the pigment adsorption site include an alkyl group having greater than or equal to 4 carbon atoms, an aryl group having greater than or equal to 6 carbon atoms, an aralkyl group having greater than or equal to 7 carbon atoms, and the like, an alkyl group having 4 to 20 carbon atoms, an aryl group having 6 to 20 carbon atoms, or an aralkyl group having 7 to 20 carbon atoms is more preferable, and an alkyl group having 4 to 15 carbon atoms (for example, an octyl group, a dodecyl group, and the like), an aryl group having 6 to 15 carbon atoms (for example, a phenyl group, a naphthyl group, and the like), or an aralkyl group having 7 to 15 carbon atoms (for example, a benzyl group and the like) is particularly preferable.

Examples of the heterocyclic residue group of the pigment adsorption site include a residue group having a heterocyclic ring selected from the group consisting of thiophene, furan, xanthene, pyrrole, pyrroline, pyrrolidine, dioxolane, pyrazole, pyrazoline, pyrazolidine, imidazole, oxazole, thiazole, oxadiazole, triazole, thiadiazole, pyran, pyridine, piperidine, dioxane, morpholine, pyridazine, pyrimidine, piperazine, triazine, trithiane, isoindoline, isoindolinone, benzimidazolone, benzothiazole, succinimide, phthalimide, naphthalimide, hydantoin, indole, quinoline, carbazole, acridine, acridone, and anthraquinone, and the like.

Examples of the amido group of the pigment adsorption site include —CONHR$^{C13}$ (here, R$^{C13}$ represents an alkyl group having 1 to 20 carbon atoms, an aryl group having greater than or equal to 6 carbon atoms, or an aralkyl group having greater than or equal to 7 carbon atoms), and the like.

Examples of the alkoxy silyl group of the pigment adsorption site include a trimethoxy silyl group, a triethoxy silyl group, and the like.

Examples of another available embodiment of the organic group having a pigment adsorption site are described in 0016 to 0046 of JP2013-43962A, and paragraphs 0016 to 0046 of JP2013-43962A are incorporated in the present invention.

In Formula 1, B represents a group having a structure represented by Formula 2.

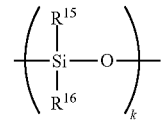

In Formula 2, R$^{15}$ and R$^{16}$ each independently represent a hydrogen atom, a hydroxy group, an aryl group, or an alkyl group having 1 to 3 carbon atoms, and k represents an integer of greater than or equal to 1.

It is preferable that R$^{15}$ and R$^{16}$ are each independently an alkyl group having 1 to 3 carbon atoms, it is more preferable that R$^{15}$ and R$^{16}$ are each independently a methyl group or an ethyl group, and it is particularly preferable that R$^{15}$ and R$^{16}$ are each independently a methyl group.

k represents an integer of greater than or equal to 1, is preferably an integer of 2 to 300, and is more preferably an integer of 10 to 200.

B represents a group having a structure represented by Formula 2.

It is preferable that the structure represented by Formula 2 is a structure derived from a silicone-based monomer. B may be independently the structure derived from the silicone-based monomer, or a combination between B and R$^{14}$ may be the structure derived from the silicone-based monomer. The silicone-based monomer may be a silicone-based macromer. Furthermore, in this specification, the "macromer (also referred to as a macro monomer)" is a general term for an oligomer (a degree of polymerization of approximately from 2 to 300) or a polymer having a polymerizable functional group, and has properties of both of a polymer and a monomer. It is preferable that the structure represented by Formula 2 described above is a structure derived from a silicone-based macromer having a weight-average molecular weight of 1,000 to 50,000 (more preferably 1,000 to 10,000, and even more preferably 1,000 to 5,000).

Further, it is preferable that the graft type silicone polymer represented by Formula 1 is soluble in an organic solvent. In a case where affinity with respect to the organic solvent is high, for example, affinity with respect to a dispersion medium is strong in a case of being used as a dispersant, and thus, an adsorption layer which is sufficient for dispersion stabilization is easily ensured.

Examples of the group having a structure represented by Formula 2 can include groups derived from X-22-174ASX, X-22-174BX, KF-2012, X-22-173BX, and X-22-3710 which are manufactured by Shin-Etsu Chemical Co., Ltd., and the like.

In Formula 1, l represents an integer of greater than or equal to 1, is preferably an integer of 1 to 100, is more preferably an integer of 1 to 60, and is particularly preferably an integer of 1 to 30.

In Formula 1, m represents an integer of greater than or equal to 0, is preferably an integer of greater than or equal to 1 from the viewpoint of increasing dispersibility of a pigment, is more preferably an integer of 1 to 60, and is particularly preferably an integer of 1 to 30.

In Formula 1, n represents an integer of greater than or equal to 1, is preferably an integer of 1 to 100, is more preferably an integer of 1 to 60, and is particularly preferably an integer of 1 to 30.

In the graft type silicone polymer represented by Formula 1, a ratio of a content of each partial structure is not particularly limited. That is, in Formula 1, ratios of l, m, and n are not particularly limited.

In addition, in the graft type silicone polymer represented by Formula 1, the order of each of the partial structures (structures in each of parentheses where a suffix of l to n is added to the bottom right or a repeating unit represented by Formula 3 described below) is not particularly limited, and the partial structures may be bonded in an arbitrary order, and for example, may be bonded by forming a block, or may be randomly bonded.

In the pigment dispersion liquid of the present invention, in Formula 1, it is preferable that m represents an integer of greater than or equal to 1.

The graft type silicone polymer represented by Formula 1 may have other repeating units other than l, m, n, and k repeating units, and it is preferable that the graft type silicone polymer represented by Formula 1 does not have the other repeating units.

Examples of the repeating units can include other repeating units having a pigment adsorption site other than A. For example, the graft type silicone polymer represented by Formula 1 may have a repeating unit having a (unreacted) thiol group represented by Formula 4 described below.

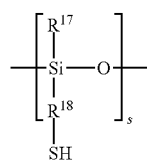

(4)

In Formula 4, $R^{17}$ and $R^{18}$ each independently represent a hydrogen atom, a hydroxy group, an aryl group, or an alkyl group having 1 to 3 carbon atoms, and s represents an integer of greater than or equal to 0.

The preferred embodiments of $R^{17}$ and $R^{18}$ in Formula 4 are identical to the preferred embodiments of $R^6$ and $R^{11}$ in Formula 1.

It is preferable that s is 0.

Examples of a polymer containing a repeating unit having a thiol group represented by Formula 4 can include KF-2001 and KF-2004 which are manufactured by Shin-Etsu Chemical Co., Ltd., and the like.

In the present invention, it is more preferable that the graft type silicone polymer represented by Formula 1 is a compound represented by Formula 3 described below.

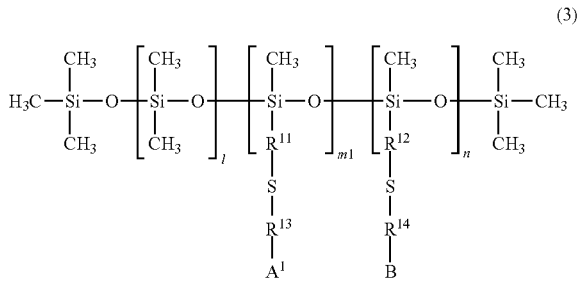

(3)

In Formula 3, $R^{11}$ and $R^{12}$ each independently represent an arylene group or an alkylene group having 1 to 3 carbon atoms, $R^{13}$ and $R^{14}$ each independently represent a single bond or a divalent organic linking group, $A^1$ represents a group having a pigment adsorption site which has at least one group selected from the group consisting of an acidic group, a group having a basic nitrogen atom, a urea group, a urethane group, a group having a coordinating oxygen atom, a hydrocarbon group having greater than or equal to 4 carbon atoms, a heterocyclic group, amido group, an alkoxy silyl group, an epoxy group, an isocyanato group, a hydroxy group, and a thiol group, B represents a group having a structure represented by Formula 2 described below, and 1, m1, and n each independently represent an integer of greater than or equal to 1.

(2)

In Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

The definitions and the preferred ranges of $R^{11}$, $R^{12}$, $R^{13}$, $R^{14}$, B, l, and n in Formula 3 are respectively identical to the definitions and the preferred ranges of $R^{11}$, $R^{12}$, $R^{13}$, $R^{14}$, B, l, and n in Formula 1.

The preferred ranges of $A^1$ and m1 in Formula 3 are respectively identical to the preferred ranges of A and m in Formula 1.

[Manufacturing Method of Graft Type Silicone Polymer]

A manufacturing method of the graft type silicone polymer represented by Formula 1 described above is not particularly limited.

For example, it is possible to synthesize the graft type silicone polymer represented by Formula 1 described above by a combination of a compound A which is mercapto modified silicone, a compound B which is a silicone macro monomer, and a compound C which is a macro monomer having a pigment adsorption site, and for example, it is possible to synthesize the graft type silicone polymer represented by Formula 1 described above by Scheme 1 described below. Furthermore, in Scheme 1 described below, an example using the compound B and the compound C which are macro monomers (specifically, a radical polymerizable monomer, and more specifically, a (meth)acrylic monomer) is described, the manufacturing method of the graft type silicone polymer represented by Formula 1 described above is not limited to such a manufacturing method.

$R^1$ to $R^{11}$, l, m, and n in the compounds A, B, and C, and Scheme 1 are respectively synonymous with $R^1$ to $R^{11}$, l, m, and n in Formula 1, p is an integer of greater than or equal to 0, k is an integer of greater than or equal to 1, $R^B$ is an arbitrary substituent, R and X each represent a substituent in Table 1-1 described below, PGMEA is propylene glycol monomethyl ether acetate which is an example of an ester-based solvent, and V-601 is dimethyl-2,2'-azobis(2-methyl propionate) which is an example of a polymerization initiator.

TABLE 1-1

|  | R | X |
|---|---|---|
| C-1 | $CH_3$ | COOH |
| C-2 | H | COOH |
| C-3 | $CH_3$ | $COOC_2H_4OCOC_2H_2COOH$ |
| C-4 | H | $C_8H_{16}COOH$ |

TABLE 1-1-continued

| | R | X |
|---|---|---|
| C-5 | H | $C_6H_4COOH$ |
| C-6 | $CH_3$ | $COOC_2H_4OCOC_6H_4COOH$ |
| C-7 | $CH2COOH$ | COOH |
| C-8 | $CH_3$ | $PO_3H_2$ |
| C-9 | H | $PO_3H_2$ |
| C-10 | $CH_3$ | $COOC_2H_2OPO_3H_2$ |
| C-11 | $CH_3$ | $COOC_2H_2PO_3H_2$ |
| C-12 | $CH_3$ | $SO_3H$ |
| C-13 | H | $SO_3H$ |
| C-14 | $CH_3$ | $CONHCH_2C(CH_3)_2SO_3H$ |
| C-15 | H | $C_6H_4SO_3H$ |
| C-16 | $CH_3$ | $COOC_2H_2OH$ |
| C-17 | $CH_3$ | $COOC_2CH(OH)CH_2OH$ |
| C-18 | $CH_3$ | $COOC_2H_2OCOC_2H_2COCH_3$ |
| C-19 | $CH_3$ | $COOC_2H_2N(CH_3)_2$ |
| C-20 | $CH_3$ | $COOC_2H_2NHCONHC_3H_7$ |
| C-21 | $CH_3$ | 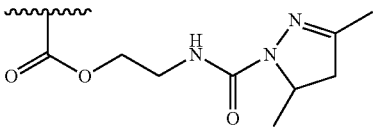 [SMILES: *C(=O)OCCNC(=O)N1N=C(C)CC1C] |
| C-22 | $CH_3$ | $COOC_3H_6Si(OCH_3)_3$ |
| C-23 | H | $COOC_3H_6Si(OCH_3)_3$ |
| C-24 | $CH_3$ | $COOC_3H_6Si(OC_2H_5)_3$ |
| C-25 | H | $COOC_3H_6Si(OC_2H_5)_3$ |
| C-26 | H | $Si(OCH_3)_3$ |
| C-27 | H | $Si(OC_2H_5)_3$ |
| C-28 | $CH_3$ | $CONHC_3H_6N(CH_3)_2$ |
| C-29 | H | $C_6H_4NH_2$ |
| C-30 | $CH_3$ | $COOCH_2COCH_2COCH_3$ |
| C-31 | $CH_3$ | $COOC_2H_2OCOC_6H_{10}COOH$ |

Compound A

Compound B

Compound C

Scheme 1

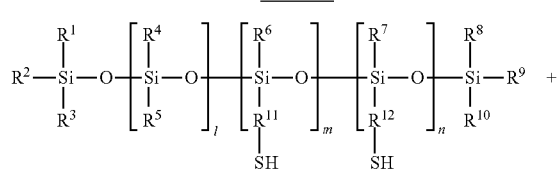

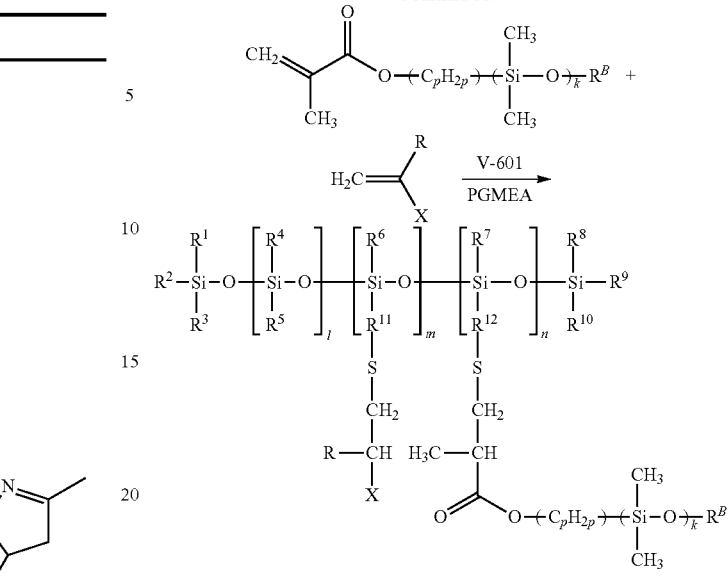

The manufacturing method of a pigment dispersant described above may be referred to the description in <0110> to <0134> of JP2013-43962A, and <0110> to <0134> of JP2013-43962A are incorporated in the present invention. Here, the present invention is not limited thereto.

A weight-average molecular weight of the graft type silicone polymer is preferably 1,000 to 5,000,000, is more preferably 2,000 to 3,000,000, and is even more preferably 2,500 to 3,000,000. In a case where the weight-average molecular weight is greater than or equal to 1,000, film forming properties become excellent.

A number average molecular weight of the graft type silicone polymer is preferably 1,000 to 5,000,000, is more preferably 2,000 to 3,000,000, and is even more preferably 2,500 to 3,000,000. In a case where the molecular weight is greater than or equal to 1,000, the film forming properties become excellent. The number average molecular weight can be calculated by using a value measured by the same method as that of the weight-average molecular weight.

One type of the graft type silicone polymer may be independently used, or two or more types thereof may be used together.

The content of the graft type silicone polymer in the composition for forming a light shielding layer and the light shielding layer is preferably 0.2 to 50 parts by mass, is more preferably 1 to 40 parts by mass, and is even more preferably 2 to 30 parts by mass, with respect to 100 parts by mass of the black pigment.

[Pigment Dispersion Liquid]

The black pigment may be added to the composition for forming a light shielding layer as a black pigment dispersion liquid. In addition, a white pigment described below may be added to a composition for forming a white colored layer as a white pigment dispersion liquid.

Hereinafter, the black pigment dispersion liquid will be described, and the same applies to the white pigment dispersion liquid.

It is preferable that the black pigment dispersion liquid contains the black pigment, the graft type silicone polymer, and at least one type of solvent selected from the group consisting of a hydrocarbon-based solvent, a ketone-based solvent, an ester-based solvent, and an alcohol-based solvent.

A method of preparing the black pigment dispersion liquid is not particularly limited, but it is preferable that only the black pigment, the graft type silicone polymer, and the solvent, and selectively a small amount of dispersion binder are used at the time of dispersing the pigment. In particular, it is preferable that an additive such as an additional binder described below or a polymerization catalyst described below is not added as the material of the black pigment dispersion liquid at the time of dispersing the black pigment dispersion from the viewpoint of not hindering a dispersion step.

It is preferable that at least one type of solvent selected from the group consisting of a hydrocarbon-based solvent, a ketone-based solvent, an ester-based solvent, and an alcohol-based solvent is used as the solvent used in the black pigment dispersion liquid.

Xylene, toluene, benzene, ethyl benzene, hexane, and the like are preferable as the hydrocarbon-based solvent.

Methyl ethyl ketone, methyl isobutyl ketone, cyclohexanone, acetone, diethyl ketone, and the like are preferable as the ketone-based solvent.

Propylene glycol monomethyl ether acetate, ethyl acetate, butyl acetate, ethyl cellosolve acetate, butyl cellosolve acetate, and the like are preferable as the ester-based solvent.

Propylene glycol monomethyl ether, ethyl cellosolve, butyl cellosolve, normal propyl alcohol, butanol, and the like are preferable as the alcohol-based solvent.

Among them, at least one type of solvent selected from the group consisting of a hydrocarbon-based solvent, an ester-based solvent, and a ketone-based solvent is preferable, and at least one type of solvent selected from the group consisting of xylene, methyl ethyl ketone, methyl isobutyl ketone, propylene glycol monomethyl ether acetate, and ethyl acetate is particularly preferable.

The content of the solvent with respect to the black pigment dispersion liquid (the total of the total solid content and the solvent) is preferably 20 to 98 mass %, is more preferably 40 to 95 mass %, and is particularly preferably 60 to 90 mass %.

A dispersing machine used at the time of dispersing the black pigment is not particularly limited, and examples of the dispersing machine include a known dispersing machine such as a kneader, a roll mill, an attritor, a super mill, a dissolver, a homomixer, a sand mill, and a beads mill described in Page 438 of "Pigment Dictionary", First Edition, which is written by Kunizou ASAKURA and is published by Asakura Publishing Co., Ltd., in 2000. Further, fine pulverization may be performed by using a frictional force according to mechanical grinding described in Page 310 of the literature described above.

In order to suppress precipitation and aggregation of black pigment particles, a binder may be added to the pigment dispersion liquid. Examples of the binder include a silicone resin described below, or the like from the viewpoint of thermal coloration.

The content of the binder with respect to the total solid content in the black pigment dispersion liquid is preferably 0.1 to 30 mass %, is more preferably 0.2 to 20 mass %, and is particularly preferably 0.5 to 10 mass %.

In addition, the content of the graft type silicone polymer in the black pigment dispersion liquid is preferably 0.2 to 50 parts by mass, is more preferably 1 to 40 parts by mass, and is even more preferably 2 to 30 parts by mass, with respect to 100 parts by mass of the black pigment.

<Resin>

In the present invention, it is preferable that the composition for forming a light shielding layer contains a resin in addition to the black pigment and the graft type silicone polymer described above.

The resin contained in the composition for forming a light shielding layer is not particularly limited, but a thermally crosslinkable resin is preferable. Examples of the thermally crosslinkable resin include a silicone resin having a siloxane bond in a main chain, an epoxy resin, a melamine resin, and the like, and among them, the silicone resin having a siloxane bond in a main chain is preferable. Furthermore, the silicone resin is a silicone resin other than the graft type silicone polymer described above.

It is preferable that a glass transition temperature (Tg) of the silicone resin described above is higher than or equal to 10° C.

Tg of the silicone resin is preferably higher than or equal to 10° C., is more preferably 10° C. to 120° C., and is even more preferably 20° C. to 100° C. By setting Tg to be in the range described above, a cured material to be obtained has excellent crack resistance at the time of being heated, and can be more preferably used as a transfer material or a decorative material.

Examples of a measurement method Tg of the silicone resin include a method of measuring Tg by using a differential scanning calorimeter (DSC).

A known silicone resin can be used as the silicone resin, and a methyl-based straight silicone resin (polydimethyl siloxane), a methyl phenyl-based straight silicone resin (polydimethyl siloxane in which a part of a methyl group is substituted with a phenyl group), an acrylic resin modified silicone resin, a polyester resin modified silicone resin, an epoxy resin modified silicone resin, an alkyd resin modified silicone resin, a rubber-based silicone resin, and the like can preferably be used. Among them, the methyl-based straight silicone resin, the methyl phenyl-based straight silicone resin, and the acrylic resin modified silicone resin are more preferable, and the methyl-based straight silicone resin and the methyl phenyl-based straight silicone resin are even more preferable.

Among them, a silicone resin having a silanol group and Tg of higher than or equal to 10° C. is preferable as the silicone resin. According to the embodiment described above, the cured material to be obtained has excellent crack resistance at the time of being heated, coloration of the cured material due to heat further decreases, and abrasion resistance of the cured material becomes more excellent.

Only one type of the silicone resin may be used, or two or more types thereof may be used by being mixed. The silicone resins are mixed at an arbitrary ratio, and thus, it is possible to control film physical properties.

A silicone resin which is dissolved in an organic solvent or the like may be used, and for example, a silicone resin which is dissolved in a xylene solution or a toluene solution can be used.

A commercially available silicone resin may be used as the silicone resin, and examples of the commercially available silicone resin preferably include KR251, KR255, KR300, KR311, KR216, ES-1001N, ES-1002T, and ES-1023 which are manufactured by Shin-Etsu Chemical Co., Ltd., and the like.

A weight-average molecular weight of the silicone resin is preferably greater than or equal to 1,000, is more preferably greater than or equal to 5,000, and is even more preferably greater than 10,000, and is preferably less than or equal to 5,000,000, is more preferably less than or equal to 3,000,000, and is even more preferably less than or equal to 2,000,000.

The content of the silicone resin is preferably 1 to 90 mass %, is more preferably 10 to 80 mass %, and is even more preferably 30 to 70 mass %, with respect to the total amount of solid contents of the composition for forming a light shielding layer.

<Solvent>

The composition for forming a light shielding layer of the present invention may contain a solvent.

The solvent is not particularly limited, and a known solvent can be used. Among them, at least one type of solvent selected from the group consisting of the hydrocarbon-based solvent, the ketone-based solvent, the ester-based solvent, and the alcohol-based solvent described above is preferable, at least one type of solvent selected from the group consisting of the hydrocarbon-based solvent and the ketone-based solvent is more preferable, and at least one type of solvent selected from the group consisting of the aromatic hydrocarbon-based solvent and the ketone-based solvent is even more preferable.

One type of the solvent may be independently used, or two or more types thereof may be used together.

The content of the solvent of the composition for forming a light shielding layer of the present invention is not particularly limited, but is preferably 10 to 90 mass %, and is more preferably 20 to 85 mass %, with respect to the total mass of the composition for forming a light shielding layer.

<Curing Catalyst>

In the present invention, in a case where the composition for forming a light shielding layer contains the silicone resin, in order to form a cured film by accelerating a crosslinking reaction thereof, a condensation reaction curing catalyst (also referred to as a curing catalyst, a condensation catalyst, or a polymerization catalyst) may be used. It is preferable that the condensation reaction curing catalyst is a metal salt, and it is more preferable that the condensation reaction curing catalyst is a condensation catalyst containing an organic acid metal salt.

A condensation catalyst known in the related art is preferably used as a condensation catalyst formed of a metal salt (excepting for an alkali metal salt and an alkali earth metal salt), and more preferably an organic acid metal salt (excepting for an alkali metal salt and an alkali earth metal salt). That is, examples of the curing catalyst can include an aluminum salt, a tin salt, and a lead salt of an organic acid or a transition metal salt, and an organic acid and the metal ions described above may form a complex salt represented by a chelate structure. A condensation catalyst containing one type or two or more types selected from aluminum, titanium, iron, cobalt, nickel, zinc, zirconium, cobalt, palladium, tin, mercury, or lead is particularly preferable as such a curing catalyst, and an organic acid zirconium salt, an organic acid tin salt, and an organic acid aluminum salt are most preferably used.

Specific examples of the condensation catalyst include an organic acid tin salt such as dibutyl tin diacetate, dibutyl tin dioctate, dibutyl tin dilaurate, dibutyl tin dimalate, dioctyl tin dilaurate, dioctyl tin dimalate, and octylate tin; an organic acid titanium salt such as tetra(i-propyl) titanate, tetra(n-butyl) titanate, dibutoxy bis(acetyl acetonate) titanium, isopropyl triisostearoyl titanate, isopropyl tris(dioctyl pyrophosphate) titanate, and bis(dioctyl pyrophosphate) oxy acetate titanate; an organic acid zirconium salt such as tetrabutyl zirconate, tetrakis(acetyl acetonate) zirconium, tetraisobutyl zirconate, butoxy tris(acetyl acetonate) zirconium, zirconium naphthenate, and zirconium octylate; an organic acid aluminum salt such as tris(ethyl acetoacetate) aluminum and tris(acetyl acetonate) aluminum; and an organic acid metal salt such as zinc naphthenate, zinc formate, zinc acetyl acetonate, iron acetyl acetonate, cobalt naphthenate, and cobalt octylate. In addition, CAT-AC, D-15, D-20, and D-25 (all are manufactured by Shin-Etsu Chemical Co., Ltd.) may be used as a commercially available product.

The use amount of the catalyst described above may be the amount of catalyst, 0.1 to 20 mass % of metal can be used with respect to the pigment dispersant, the dispersion binder, and an additional binder resin, and the use amount of the catalyst can be arbitrarily selected according to curing conditions.

<Other Additives>

The composition for forming a light shielding layer of the present invention may contain other additives other than the additives described above.

The other additives are not particularly limited, but a known additive can be used, and for example, a coating auxiliary agent, an antioxidant, a polymerization inhibitor, and the like can be used.

The total ratio of the graft type silicone polymer and the silicone resin with respect to components other than the pigment contained in the light shielding layer is preferably greater than or equal to 60 mass %, is more preferably greater than or equal to 70 mass %, and is even more preferably greater than or equal to 80 mass %.

A film thickness of the light shielding layer in the substrate with a decorative material of the present invention is preferably 1.0 to 5.0 µm, and is more preferably 1.0 to 4.0 µm, from the viewpoint of increasing the covering power of the light shielding layer.

An optical density (OD) of the light shielding layer is preferably greater than or equal to 3.5, and is particularly preferably greater than or equal to 4.0, from the viewpoint of increasing the covering power of the light shielding layer.

Surface electrical resistance of the light shielding layer is preferably greater than or equal to $1.0 \times 10^{10}$ Ω/square, is more preferably greater than or equal to $1.0 \times 10^{11}$ Ω/square, is even more preferably greater than or equal to $1.0 \times 10^{12}$ Ω/square, and is particularly preferably greater than or equal to $1.0 \times 10^{13}$ Ω/square. Furthermore, Ω/square is Ω of each square.

(White Colored Layer)

The substrate with a decorative material of the present invention includes the white colored layer between the substrate and the light shielding layer.

The white colored layer contains a white pigment, and it is preferable that the white colored layer contains a pigment dispersant and a resin.

The white pigment is not particularly limited, and a white pigment described in paragraph 0015 or paragraph 0114 of JP2005-7765A can be used.

Specifically, titanium dioxide, zinc oxide, lithopone, light calcium carbonate, white carbon, aluminum oxide, aluminum hydroxide, and barium sulfate are preferable as the white pigment, and the titanium dioxide and the zinc oxide are more preferable, and in the present invention, the titanium dioxide is particularly preferable as the white pigment, and among them, rutile type titanium dioxide or anatase type titanium dioxide is more particularly preferable, and the rutile type titanium dioxide is even more particularly preferable.

The surface of the titanium dioxide can be subjected to a silica treatment, an alumina treatment, a titania treatment, a zirconia treatment, an organic substance treatment, and a combination thereof.

Accordingly, it is possible to suppress catalytic activity of titanium dioxide, and it is possible to improve heat resistance, matting properties, and the like.

The alumina treatment, the zirconia treatment, and the silica treatment are preferable as a surface treatment with respect to the surface of the titanium dioxide, and a combined treatment of alumina/zirconia or a combined treatment of alumina/silica is particularly preferable, from the viewpoint of suppressing a b* value after performing a high temperature treatment with respect to a coated film of the composition for forming a white colored layer of the present invention.

The content of the white pigment in the white colored layer of the present invention is preferably 5 to 75 mass %, is more preferably 15 to 65 mass %, and is even more preferably 25 to 55 mass %.

That is, the content of the white pigment is preferably 5 to 75 mass %, is more preferably 15 to 65 mass %, and is even more preferably 25 to 55 mass %, with respect to the total solid content of the composition for forming a white colored layer.

In the present invention, it is preferable that the white colored layer contains the graft type silicone polymer represented by Formula 1 described above as the pigment dispersant. The content of the graft type silicone polymer is preferably 0.2 to 25 parts by mass, is more preferably 0.5 to 20 parts by mass, and is even more preferably 1 to 15 parts by mass, with respect to 100 parts by mass of the white pigment.

In addition, as with the black pigment in the light shielding layer described above, the white pigment may be added to the composition for forming a white colored layer as a white pigment dispersion liquid, and the content of the white pigment in the white pigment dispersion liquid is preferably 20 to 90 mass %, is more preferably 30 to 80 mass %, and is even more preferably 40 to 75 mass %, with respect to the entire white pigment dispersion liquid.

In addition, it is preferable that the white colored layer contains the same silicone resin as that of the light shielding layer as the resin.

Further, the white colored layer may contain a curing catalyst and a solvent, and may contain the other additives described in the light shielding layer described above.

The total ratio of the graft type silicone polymer and the silicone resin with respect to components other than the pigment contained in the white colored layer is preferably greater than or equal to 60 mass %, is more preferably greater than or equal to 70 mass %, is even more preferably greater than or equal to 80 mass %, and is particularly preferably greater than or equal to 90 mass %.

(Conductive Layer)

It is preferable that the substrate with a decorative material of the present invention further includes the conductive layer on the light shielding layer.

A conductive layer described in JP2009-505358A can be preferably used as the conductive layer. In addition, the configuration or the shape of the conductive layer is described in the description of a first transparent electrode pattern, a second electrode pattern, and other conductive elements in the description of a touch panel of the present invention described below.

In the substrate with a decorative material of the present invention, it is preferable that the conductive layer contains indium (including an indium-containing compound such as indium tin oxide (ITO) or an indium alloy).

In the substrate with a decorative material of the present invention, crack resistance of the decorative material of the present invention is high, and thus, even in a case where the conductive layer is subjected to vapor deposition by sputtering, it is possible to improve film physical properties of the decorative material, and in a case where the decorative material is a white decorative material, it is possible to decrease the b* value of the decorative material.

(Manufacturing Method of Substrate with Decorative Material)

A manufacturing method of the substrate with a decorative material of the present invention is not particularly limited, but it is preferable that a layer formed of the composition for forming a white colored layer and a layer formed of the composition for forming a light shielding layer, or a layer formed by drying the composition for forming a white colored layer (an uncured white colored layer) and a layer formed by drying the composition for forming a light shielding layer (an uncured light shielding layer) are prepared by a method selected from the group consisting of film transfer, thermal transfer printing, screen printing, and ink jet printing, and it is more preferable that the layers are prepared by the film transfer.

Specifically, the manufacturing method of the substrate with a decorative material includes a step of laminating an uncured white colored layer and an uncured light shielding layer on the substrate in this order, and it is preferable that the uncured white colored layer and the uncured light shielding layer are prepared by any one method described below. Specifically, it is preferable that the uncured white colored layer and the uncured light shielding layer are prepared by a method selected from the group consisting of a method in which at least one of the uncured white colored layer or the uncured light shielding layer is transferred from a film transfer material including at least one of the uncured white colored layer or the uncured light shielding layer on a temporary support, and then, the temporary support is removed, a thermal transfer printing in which a thermal transfer material a including at least one of the uncured white colored layer or the uncured light shielding layer on a temporary support is heated on the temporary support side, and thus, at least one of the uncured white colored layer or the uncured light shielding layer is transferred from the temporary support, screen printing of the composition for forming a white colored layer or the composition for forming a light shielding layer, and ink jet printing of the composition for forming a white colored layer or the composition for forming a light shielding layer. In addition, it is preferable that a step is included in which the decorative material is in the shape of a frame to surround the light transmissive region on the substrate, and the tilt portion is formed in the inner edge of the decorative material such that the thickness of the decorative material towards the inside of the light transmissive region becomes thin.

The uncured white colored layer and the uncured light shielding layer may be formed by combining a plurality of film transfer, thermal transfer printing, screen printing, and ink jet printing.

Further, in the manufacturing method of the substrate with a decorative material, it is preferable that the uncured white colored layer and the uncured light shielding layer are formed by any method described below. Specifically, it is preferable that the uncured white colored layer and the uncured light shielding layer are formed by transferring the uncured light shielding layer and the uncured white colored layer onto the substrate from a film transfer material including at least the temporary support, the uncured light shielding layer, and the uncured white colored layer in this order, and then, by removing the temporary support, or are formed by transferring the uncured white colored layer onto the substrate from a film transfer material including the temporary support and the uncured white colored layer, and then, by removing the temporary support, and by transferring the uncured light shielding layer onto the uncured white colored layer from a film transfer material including at least the temporary support and the uncured light shielding layer, and then, by removing the temporary support.

(Transfer Material for Forming Decorative Material)

<Film Transfer: Film Transfer Material>

A transfer material for forming a decorative material of the present invention includes a layer formed of the composition for forming a white colored layer or a layer formed by drying the composition for forming a white colored layer (the uncured white colored layer) on a temporary support, and it is preferable that the transfer material for forming a decorative material of the present invention includes a layer formed of the composition for forming a light shielding layer or a layer formed by drying the composition for forming a light shielding layer (the uncured light shielding layer).

It is preferable that the transfer material for forming a decorative material of the present invention is a film transfer material.

Figure 7:
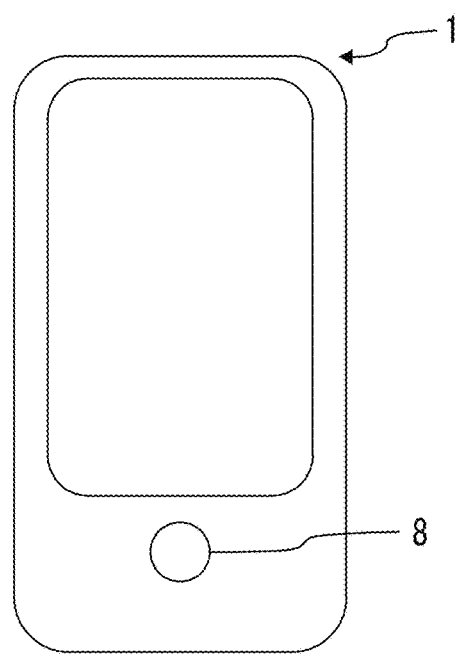
FIG. 7 is an explanatory diagram illustrating an example of a substrate of the touch panel.

As illustrated in FIG. 7, in a capacitance type input device (a touch panel) using the substrate (the front plate) 1 having an opening portion 8, in a case where the uncured white colored layer (the white colored layer before being heated), the uncured light shielding layer, or the like is formed by using a film transfer material, a leakage of a resist component from the opening portion 8 is suppressed even in the substrate 1 having the opening portion 8. In particular, the resist component is not leaked from the end of the substrate 1 in the white colored layer 2a or the light shielding layer 2b in which it is necessary to form a pattern up to the boundary of the substrate 1, and thus, contamination of a back side of the substrate 1 is suppressed. For this reason, a touch panel having a merit of a reduction in a thickness and a weight can be manufactured in a simple step.

It is preferable that the film transfer material includes the temporary support, the uncured light shielding layer, and the uncured white colored layer.

[Temporary Support]

It is preferable that the transfer material includes a temporary support.

As the temporary support, a temporary support which has flexibility and is not considerably deformed, contracted, or stretched even under pressure, or under pressure and heating is preferable. Examples of such a temporary support can include a polyethylene terephthalate film, a cellulose triacetate film, a polystyrene film, a polycarbonate film, and the like, and among them, a biaxially stretched polyethylene terephthalate film is particularly preferable.

The thickness of the temporary support is not particularly limited, but is preferably 5 to 300 μm, and is more preferably 20 to 200 μm.

In addition, the temporary support may be transparent, and may contain dyed silicon, alumina sol, a chromium salt, a zirconium salt, and the like.

In addition, conductivity can be applied to the temporary support by a method or the like described in JP2005-221726A.

[Thermoplastic Resin Layer]

The transfer material may include at least one thermoplastic resin layer.

It is preferable that the thermoplastic resin layer is disposed between the temporary support and the uncured light shielding layer. That is, it is preferable that the transfer material includes the temporary support, the thermoplastic resin layer, the uncured light shielding layer, and the uncured white colored layer in this order. An organic polymer substance described in JP1993-72724A (JP-H05-72724A) is preferable as a component used in the thermoplastic resin layer, and it is particularly preferable that an organic polymer substance of which a softening point according to a Vicat method (specifically, a polymer softening point measurement method using an American material test method ASTMD 1235) is approximately lower than or equal to 80° C. is selected.

Specifically, examples of an organic polymer used in the thermoplastic resin layer include an organic polymer such as polyolefin such as polyethylene and polypropylene, a copolymer of ethylene and vinyl acetate or a saponified product thereof, an ethylene copolymer such as a copolymer of ethylene and acrylic acid ester or a saponified product thereof, a vinyl chloride copolymer such as a copolymer of polyvinyl chloride, vinyl chloride, vinyl acetate, and a saponified product thereof, a styrene copolymer such as a copolymer of polyvinylidene chloride, a vinylidene chloride copolymer, polystyrene, styrene, and (meth)acrylic acid ester, or a saponified product thereof, a vinyl toluene copolymer such as a copolymer of polyvinyl toluene, vinyl toluene, and (meth)acrylic acid ester, or a saponified product thereof, a (meth)acrylic acid ester copolymer such as a copolymer of poly(meth)acrylic acid ester, butyl (meth)acrylic acid, and vinyl acetate, a polyamide resin such as vinyl acetate copolymer nylon, copolymerization nylon, N-alkoxy methylated nylon, and N-dimethyl aminated nylon.

The thickness of the thermoplastic resin layer is preferably 6 to 100 μm, and is more preferably 6 to 50 μm. In a case where the thickness of the thermoplastic resin layer is in the range described above, even in a case where concavities and convexities exist on the substrate, it is possible to sufficiently absorb the concavities and convexities, and thus smoothness is excellent.

[Interlayer]

The transfer material may includes at least one interlayer in order to prevent the components from being mixed at the time of coating a plurality of coated layers and of being preserved after the coating.

In a case where the thermoplastic resin layer is disposed between the temporary support and the uncured light shielding layer, it is preferable that the interlayer is disposed between the thermoplastic resin layer and the uncured light shielding layer. That is, it is preferable that the transfer material includes the temporary support, the thermoplastic resin layer, the interlayer, the uncured light shielding layer, and the uncured white colored layer in this order.

It is preferable that an oxygen blocking film having an oxygen blocking function which is described in JP1993-72724A (JP-H05-72724A) as a "separating layer" is used as the interlayer, and in this case, sensitivity at the time of performing exposure increases, a time load of an exposure machine is reduced, and productivity is improved.

A film which has low oxygen permeability and is dispersed or dissolved in water or an alkali aqueous solution is preferable as the oxygen blocking film, and the oxygen blocking film can be suitably selected from known oxygen blocking films. Among them, a layer containing polyvinyl alcohol and polyvinyl pyrrolidone is particularly preferable.

The thickness of the interlayer is preferably 0.1 to 5.0 µm, and is more preferably 0.5 to 2.0 µm. In a case where the thickness of the interlayer is in the range described above, the oxygen blocking function does not decrease, and a time required for development or removal of the interlayer does not excessively increase.

[Protective Peeling Layer]

It is preferable that a protective peeling layer (also referred to as a cover film) is disposed in the transfer material to cover the uncured layer in order to protect the uncured layer from contamination or damage at the time of being stored. The protective peeling layer may be formed of a material identical to or similar to the material of the temporary support, and should be easily separated from the uncured light shielding layer. For example, silicone paper and a polyolefin sheet or a polytetrafluoroethylene sheet are suitable as the material of the protective peeling layer.

The thickness of the protective peeling layer is preferably 1 to 100 µm, is more preferably 5 to 50 µm, and is particularly preferably 10 to 30 µm. In a case where the thickness is greater than or equal to 1 µm, the strength of the protective peeling layer is sufficient, and thus, the protective peeling layer is rarely broken, and in a case where the thickness is less than or equal to 100 µm, the price of the protective peeling layer does not increase, and wrinkles rarely occur at the time of laminating the protective peeling layer.

Examples of a commercially available protective peeling layer include a polyethylene terephthalate film such as ALPHAN MA-410, E-200C, and E-501 manufactured by Oji Paper Co., Ltd., a polypropylene film manufactured by Shin-Etsu Film Co., Ltd. or the like, PS series such as PS-25 manufactured by TEIJIN LIMITED, and the like, but are not limited thereto. In addition, a commercially available film is subjected to sand blast processing, and thus, the commercially available film can be simply manufactured.

A polyolefin film such as a polyethylene film can be used as the protective peeling layer. In addition, the polyolefin film used as the protective peeling layer is preferably manufactured by thermally fusing, kneading, extruding, biaxially stretching, and casting a raw material or an inflation method.

<Manufacturing Method of Film Transfer Material>

A manufacturing method of the film transfer material is not particularly limited, and for example, the film transfer material can be manufactured by steps described in paragraphs 0064 to 0066 of JP2005-3861A. In addition, the film transfer material, for example, can be prepared by a method described in JP2009-116078A.

An example of the manufacturing method of the film transfer material includes a method including a step of forming layers by respectively applying the composition for forming a white colored layer and the composition for forming a light shielding layer onto the temporary support, and by drying the compositions, and a step of covering the formed layers with the protective peeling layer.

Here, the film transfer material which can be used in the present invention may form at least two layers of the uncured white colored layer and the uncured light shielding layer. Alternatively, a film transfer material including the temporary support and the uncured white colored layer may be transferred onto the substrate, and then, the temporary support may be removed, and a film transfer material including at least the temporary support and the uncured light shielding layer may be transferred onto the uncured white colored layer, and then, the temporary support may be removed. In the former case, in the transfer material of the present invention, there is a case where the uncured white colored layer and the uncured light shielding layer are laminated on the temporary support in this order, and this case is preferable in process since it is possible to dispose the white colored layer and the light shielding layer on the substrate (preferably, on glass) at once.

In the film transfer material which can be used in the present invention, unless otherwise contrary to the gist of the present invention, other layers may be further formed. In addition, before the uncured white colored layer is formed, the thermoplastic resin layer and/or the interlayer (an oxygen blocking layer) may be formed by coating.

A known coating method can be used as a method of applying the composition for forming a white colored layer, the composition for forming a light shielding layer, a coating liquid for forming a thermoplastic resin layer, a coating liquid for forming an interlayer, and the like onto the temporary support. For example, the coating liquids are applied by using a coater such as a spinner, a whirler, a roller coater, a curtain coater, a knife coater, a wire bar coater, and an extruder, and are dried, and thus, the layers can be formed.

[Solvent]

Each layer of the film transfer material can be preferably prepared by using a solvent along with each component.

Examples of the solvent include esters, for example, ethyl acetate, n-butyl acetate, isobutyl acetate, amyl formate, isoamyl acetate, isobutyl acetate, butyl propionate, isopropyl butyrate, ethyl butyrate, butyl butyrate, alkyl esters, methyl lactate, ethyl lactate, methyloxy acetate, ethyloxy acetate, butyloxy acetate, methyl methoxy acetate, ethyl methoxy acetate, butyl methoxy acetate, methyl ethoxy acetate, ethyl ethoxy acetate, 3-oxy propionic acid alkyl esters (for example, methyl 3-methoxy propionate, ethyl 3-methoxy propionate, methyl 3-ethoxy propionate, and ethyl 3-ethoxy propionate) such as methyl 3-oxy propionate and ethyl 3-oxy propionate, 2-oxy propionic acid alkyl esters (for example, methyl 2-methoxy propionate, ethyl 2-methoxy propionate, propyl 2-methoxy propionate, methyl 2-ethoxy propionate, ethyl 2-ethoxy propionate, methyl 2-oxy-2-methyl propionate, ethyl 2-oxy-2-methyl propionate, methyl 2-methoxy-2-methyl propionate, and ethyl 2-ethoxy-2-methyl propionate) such as methyl 2-oxy propionate, ethyl 2-oxy propionate, and propyl 2-oxy propionate, methyl pyruvate, ethyl pyruvate, propyl pyruvate, methyl acetoacetate, ethyl acetoacetate, methyl 2-oxobutanoate, ethyl 2-oxobutanoate, and the like;

ethers, for example, diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol monomethyl ether acetate, propylene glycol monoethyl ether acetate, propylene glycol propyl ether acetate, and the like;

ketones, for example, methyl ethyl ketone, methyl isobutyl ketone, cyclohexanone, 2-heptanone, 3-heptanone, and the like;

aromatic hydrocarbons, for example, toluene and xylene; and the like.

Among them, the methyl ethyl ketone, the methyl isobutyl ketone, the xylene, the cyclohexanone, the propylene glycol monomethyl ether, the propylene glycol monomethyl ether acetate, and the like are preferable.

One type of the solvent may be independently used, or two or more types thereof may be used in combination.

A method of covering the light shielding layer with the protective peeling layer is not particularly limited, and a method can be used in which the protective peeling layer is superimposed on the uncured light shielding layer on the temporary support, and is subjected to pressure bonding.

A known laminator such as a laminator, a vacuum laminator, and an automatic cutting laminator for further increasing productivity can be used in the pressure bonding.

An atmospheric temperature of 20° C. to 45° C. and a line pressure of 1,000 to 10,000 N/m are preferable as the conditions of the pressure bonding.

[Transfer Method (Lamination Method)]

A transfer method (a lamination method) of the present invention is a method using the transfer material for forming a decorative layer of the present invention, and is preferably a method including a transfer step of transferring at least the white colored layer and the light shielding layer, or the layer formed by drying the composition for forming a white colored layer (the uncured white colored layer) and the layer formed by drying the composition for forming a light shielding layer (the uncured light shielding layer) onto the substrate.

Transferring (bonding) the uncured white colored layer and the uncured light shielding layer to the surface of the substrate is performed by superimposing the uncured white colored layer on the surface of the substrate, and by pressing and heating the uncured white colored layer. A known laminator such as described above can be used in the bonding.

A method in which a desirably punched uncured white colored layer and the uncured light shielding layer are transferred onto the substrate, and thus, accuracy is excellent in sheet type lamination, and air bubbles do not enter between the substrate and the uncured white colored layer is preferable as the lamination method from the viewpoint of increasing a yield ratio. Specifically, a vacuum laminator can be preferably used.

Examples of a device used in the lamination (continuous type lamination/sheet type lamination) can include V-SE340aaH manufactured by CLIMB PRODUCTS CO., LTD., and the like.

Examples of the vacuum laminator device can include a vacuum laminator device manufactured by Takanoseiki Corporation, FVJ-540R and FV700 manufactured by Taisei Laminator Co., LTD., and the like.

By including a step of further laminating a support on the temporary support opposite on a side opposite to the uncured white colored layer, that is, on the uncured light shielding layer side before the film transfer material is bonded to the substrate, it is possible to obtain a preferred effect in which air bubbles do not enter at the time of performing the lamination. At this time, the support to be used is not particularly limited, and examples of the material of the support can include polyethylene terephthalate, polycarbonate, triacetyl cellulose, and a cycloolefin polymer.

In addition, it is preferable that a film thickness of the support described above is in a range of 50 to 200 μm.

[Step of Removing Temporary Support]

It is preferable that the transfer method of the present invention includes a step of removing the temporary support from the transfer material which is bonded to the substrate.

[Step of Removing Thermoplastic Resin Layer and Step of Removing Interlayer]

Further, in a case where the film transfer material includes the thermoplastic resin layer or the interlayer, it is preferable that the transfer method of the present invention includes a step of removing the thermoplastic resin layer and/or the interlayer.

In general, the step of removing the thermoplastic resin layer and/or the interlayer can be performed by an alkali developer which is used in a photolithography system.

The alkali developer is not particularly limited, and a known developer such as a developer described in JP1993-72724A (JP-H05-72724A) can be used. Furthermore, a developer which allows the decorative material to have a soluble type development behavior is preferable as the developer, and for example, a developer containing a compound having pKa of 7 to 13 at a concentration of 0.05 to 5 mol/L is preferable. A small amount of an organic solvent having miscibility with respect to water may be added to the developer.

Examples of the organic solvent having miscibility with respect to water can include methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, ε-caprolactone, γ-butyrolactone, dimethyl formamide, dimethyl acetoamide, hexamethyl phosphoramide, ethyl lactate, methyl lactate, ε-caprolactam, N-methyl pyrrolidone, and the like. It is preferable that the concentration of the organic solvent is 0.1 to 30 mass %.

In addition, a known surfactant can be further added to the alkali developer. It is preferable that the concentration of the surfactant is 0.01 to 10 mass %.

A method of performing the step of removing the thermoplastic resin layer and/or the interlayer may be any one of paddling, shower, shower & spinning, dipping, and the like. Here, in the description of the shower, the thermoplastic resin layer or the interlayer can be removed by spraying the developer using the shower. In addition, it is preferable that a washing agent or the like is sprayed by the shower after performing the development, and the residue is removed while being wiped with a brush or the like. It is preferable that a liquid temperature is 20° C. to 40° C., and it is preferable that pH is 8 to 13.

[Postbaking Step]

In the present invention, it is preferable that a postbaking step is provided after the transfer step, and it is more preferable that a step of performing postbaking is provided after the step of removing the thermoplastic resin layer and/or the interlayer. It is preferable that the decorative material is formed by curing the uncured layer by performing the postbaking.

In the postbaking step, the uncured white colored layer and the uncured light shielding layer of the transfer material are formed by being heated at 50° C. to 300° C. under an environment of 0.08 to 1.2 atm from the viewpoint of making a strength and productivity compatible. Furthermore, 1 atm is 0.101325 MPa.

In addition, it is preferable that a tilt portion formed such that the thickness of the decorative material becomes thin towards the inside of the light transmissive region is formed in the inner edge of the decorative material of the present invention. It is preferable that the tilt portion is formed by contracting the light shielding layer with heating. For example, in the postbaking step, the decorative material is heated at 50° C. to 300° C., and thus, the light shielding layer is contracted, and accordingly, the tilt portion can be formed.

It is more preferable that the heating in the postbaking is performed under an environment of greater than or equal to 0.5 atm. On the other hand, it is more preferable that the heating is performed under an environment of less than or equal to 1.1 atm, and it is particularly preferable that the heating is performed under an environment of less than or equal to 1.0 atm. Further, it is more particularly preferable that the heating is performed under an environment of approximately 1 atm (an atmospheric pressure) from the viewpoint of enabling manufacturing costs to be reduced without using a special decompression device. Here, in the related art, in a case where the white colored layer and the light shielding layer are formed by being cured with heating, the heating is performed under a decompression environment in which the pressure is extremely low, and an oxygen concentration decreases, and thus, a strength after baking is maintained. In contrast, by using the film transfer material, it is possible to improve the tint of the white colored layer and the light shielding layer of the substrate with a decorative material of the present invention on the substrate side (to decrease the b* value) even after the baking is performed in the pressure range described above, and to increase a whiteness.

A postbaking temperature is preferably 50° C. to 300° C., is more preferably 100° C. to 300° C., and is even more preferably 120° C. to 300° C.

In addition, the postbaking may be performed at each of two or more different temperatures only for a predetermined time. For example, first, the heating can be performed preferably at 50° C. to 200° C., and more preferably at 100° C. to 200° C., and then, the heating can be performed preferably at 200° C. to 280° C., and more preferably at 220° C. to 260° C.

A postbaking time is more preferably 20 to 150 minutes, and is particularly preferably 30 to 100 minutes. In a case where the postbaking is performed on two or more temperature stages, it is preferable that the postbaking is performed such that the total time in each stage becomes 20 to 150 minutes.

The postbaking may be performed under an air environment, or may be performed under a nitrogen substituted environment, but it is particularly preferable that the postbaking is performed under the air environment from the viewpoint of enabling manufacturing costs to be reduced without using a special decompression device.

[Other Steps]

The transfer method of the present invention may include other steps other than the steps described above.

Furthermore, a method described in paragraphs 0035 to 0051 of JP2006-23696A can also be preferably used in the present invention as an example of the development step, the step of removing the thermoplastic resin layer and/or the interlayer, and the other steps.

<Thermal Transfer Printing>

In the thermal transfer printing, the uncured white colored layer and the uncured light shielding layer are prepared by thermal transfer. Specifically, the thermal transfer material including at least the uncured white colored layer on the temporary support is heated on the temporary support side, at least the uncured white colored layer is transferred from the temporary support, and then, the thermal transfer material including at least the uncured light shielding layer on the temporary support is heated on the temporary support side, and at least the uncured light shielding layer is transferred from the temporary support. It is preferable that the uncured white colored layer and the uncured light shielding layer included in the thermal transfer material contain the graft type silicone polymer represented by Formula 1. Furthermore, it is preferable that the thermal transfer is performed at a heating temperature for a heating time where the uncured layer is not completely cured. Ink ribbon printing is preferable as a method of performing the thermal transfer printing. Examples of a method of performing the ink ribbon printing which is used in the manufacturing method of the substrate with a decorative material of the present invention can include a method described in "Non-Impact Printing—Technology and Material—(published by CMC Publishing CO., LTD. on Dec. 1, 1986)", and the like.

<Screen Printing>

In the screen printing, the uncured white colored layer and/or the uncured light shielding layer are prepared by performing screen printing with respect to the composition for forming a white colored layer and/or the composition for forming a light shielding layer. The composition for forming a light shielding layer contains the black pigment and the graft type silicone polymer represented by Formula 1.

A method of performing the screen printing is not particularly limited, and a known method can be used, and for example, a method described in JP4021925B, and the like can be used. In addition, by performing the screen printing a plurality of times, it is possible to make a film thickness thick even in the screen printing.

<Ink Jet Printing>

In the ink jet printing, the uncured white colored layer and/or the uncured light shielding layer are prepared by performing ink jet printing with respect to the composition for forming a white colored layer and/or the composition for forming a light shielding layer. The composition for forming a light shielding layer contains the black pigment and the graft type silicone polymer represented by Formula 1. Examples of a method of performing the ink jet printing which is used in the manufacturing method of the substrate with a decorative material of the present invention can include a method described in "Electronics Application of Ink Jet Technology (published by REALIZE Science & Engineering on Sep. 29, 2006)" and the like.

(Touch Panel)

A touch panel of the present invention includes the decorative material formed by using the transfer material for forming a decorative material of the present invention or the substrate with a decorative material of the present invention.

It is preferable that such a touch panel is a capacitance type input device.

<Capacitance Type Input Device and Image Display Device Including Capacitance Type Input Device as Constituent>

It is preferable that the capacitance type input device includes a front plate (also referred to as a substrate), and at least the following elements of (1) to (4) on the front plate on a non-contact side, and includes the substrate with a decorative material of the present invention as a laminate of the front plate (the substrate) and (1) decorative material.

(1) Decorative material (2) A plurality of first transparent electrode patterns which are formed by allowing a plurality of pad portions to extend in a first direction through a connection portion (3) A plurality of second electrode patterns which are electrically insulated from the first transparent electrode pattern and are formed of a plurality of pad portions formed by extending in a direction intersecting with the first direction (4) Insulating layer which electrically insulates the first transparent electrode pattern from the second electrode pattern In addition, in the capacitance type input device, the second electrode pattern may be a transparent electrode pattern.

Further, the capacitance type input device may further include the following element (5).

(5) Conductive element which is electrically connected to at least one of the first transparent electrode pattern or the second transparent electrode pattern and is different from the first transparent electrode pattern and the second transparent electrode pattern Further, it is more preferable that the capacitance type input device includes the substrate with a decorative material of the present invention as a laminate including the front plate (the substrate), (1) decorative material, and at least one electrode pattern of (2), (3), or (5) described above as the conductive layer.

<Configuration of Capacitance Type Input Device>

First, the configuration of the capacitance type input device will be described.

Figure 5:
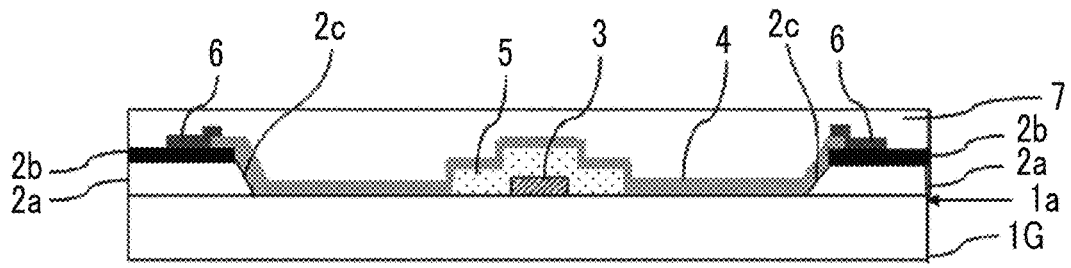
FIG. 5 is a sectional schematic view illustrating a configuration of an example of a touch panel using a substrate with a decorative material.
Figure 6:
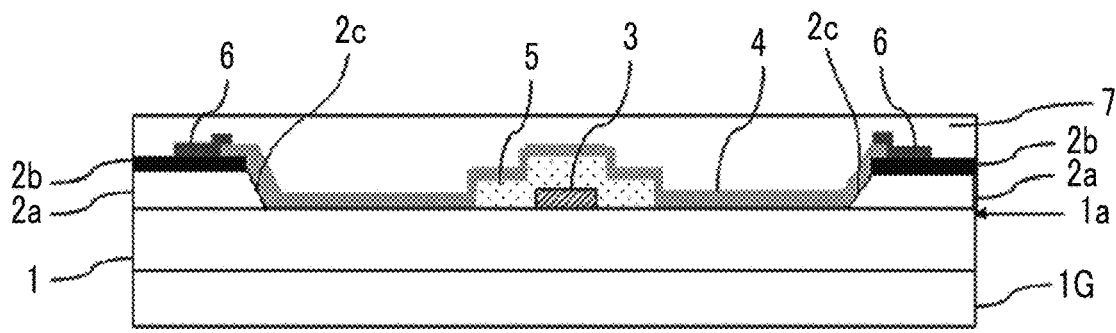
FIG. 6 is a sectional schematic view illustrating a configuration of another example of the touch panel using the substrate with a decorative material.

FIG. 5 and FIG. 6 are sectional views illustrating a preferred configuration of the capacitance type input device of the present invention.

In FIG. 5, a capacitance type input device 10 is configured of a front plate 1G (cover glass), the white colored layer 2a, the light shielding layer 2b, a first transparent electrode pattern 3, a second transparent electrode pattern 4, an insulating layer 5, a conductive element 6, and a transparent protective layer 7. The white colored layer 2a includes the tilt portion 2c, and the white colored layer 2a is formed such that the thickness towards the inside of the front plate 1G becomes thin.

Another example of the capacitance type input device illustrated in FIG. 6 includes the substrate 1 formed of a film (the film substrate) between the cover glass 1G and the white colored layer 2a in addition to the configuration of the capacitance type input device 10. That is, the cover glass 1G may be disposed on the surface of the substrate 1 on a side opposite to the surface on which the first transparent electrode pattern 3 or the like is disposed. There is a case where the substrate 1 and/or the cover glass 1G are referred to as a "front plate".

It is preferable that the substrate 1 and/or the cover glass 1G are configured of a light transmissive substrate. Both of a light transmissive substrate in which the decorative material is disposed on the cover glass 1G or a light transmissive substrate in which the decorative material is disposed on the substrate 1 on the cover glass 1G can be used as the light transmissive substrate.

It is preferable that the decorative material is disposed on the cover glass 1G from the viewpoint of thinning the touch panel. It is preferable that the decorative material is disposed on the substrate 1, and the decorative material and the substrate 1 are bonded onto the cover glass from the viewpoint of productivity of the touch panel.

Strengthened glass represented by gorilla glass manufactured by Corning Incorporated, and the like can be used as the cover glass 1G.

In addition, in FIG. 5 and FIG. 6, a side the substrate 1 and/or the cover glass 1G on which each element is disposed (an upper side in FIG. 5 and FIG. 6) will be referred to as a non-contact surface 1a. In the capacitance type input device, input is performed by bringing a finger or the like into contact with a contact surface (a surface opposite to the non-contact surface 1a, a lower side in FIG. 5 and FIG. 6) of the substrate 1 and/or the cover glass 1G.

The white colored layer 2a and the light shielding layer 2b are disposed on the non-contact surface 1a of the substrate 1 and/or the cover glass 1G. The white colored layer 2a and the light shielding layer 2b configure the decorative material, and the decorative material is a pattern in the shape of a frame surrounding the light transmissive region (the display region) formed on the substrate 1 and/or the cover glass 1G on the non-contact surface 1a side. The decorative material is formed in order to make drawing wiring or the like invisible or to perform decoration.

The capacitance type input device of the present invention can include a wiring lead-out port (not illustrated). In a case where the substrate with a decorative material of the capacitance type input device including a wiring lead-out portion is formed, the white colored layer 2a may be formed by using a liquid resist for forming a decorative material or a screen printing ink. It is preferable that a substrate with a decorative material including the wiring lead-out portion is used from the viewpoint of easily preventing the contamination of the back side of the substrate.

A plurality of first transparent electrode patterns 3 which are formed by allowing a plurality of pad portions to extend in a first direction through a connection portion, a plurality of second transparent electrode patterns 4 which are electrically insulated from the first transparent electrode pattern 3 and are formed of a plurality of pad portions formed by extending in a direction intersecting with the first direction, and the insulating layer 5 which electrically insulates the first transparent electrode pattern 3 from the second transparent electrode pattern 4 are formed non-contact surface 1a side of the substrate 1 and/or the cover glass 1G. The first transparent electrode pattern 3, the second transparent electrode pattern 4, and the conductive element 6, for example, can be prepared by a conductive metal oxide film having light transmissivity such as indium tin oxide (ITO) or indium zinc oxide (IZO). Examples of such a metal film include an ITO film; a metal film of Al, Zn, Cu, Fe, Ni, Cr, Mo, and the like; a metal oxide film of $SiO_2$ and the like, and the like. At this time, a film thickness of each element can be set to 10 to 200 nm. In addition, an amorphous ITO film is set to be a polycrystalline ITO film by calcining, and thus, electrical resistance can be reduced. In addition, the first transparent electrode pattern 3, the second transparent electrode pattern 4, and the conductive element 6 can be manufactured by using a transfer film including a decorative material using a conductive fiber. In addition, in a case where the first conductive pattern or the like is formed by ITO and the like, it is possible to refer to paragraphs 0014 to 0016 of JP4506785B and the like.

In addition, at least one of the first transparent electrode pattern 3 or the second transparent electrode pattern 4 can be disposed over both regions of the non-contact surface 1a and the light shielding layer 2b on the non-contact surface 1a and the surface of the light shielding layer 2b on a side opposite to the substrate 1 and/or the cover glass 1G (the upper side in FIG. 5 and FIG. 6). In FIG. 5 and FIG. 6, it is illustrated that the second transparent electrode pattern 4 is disposed over both regions of the non-contact surface 1a and the light shielding layer 2b on the non-contact surface 1a and the surface of the light shielding layer 2b on a side opposite to the substrate 1 and/or the cover glass 1G (the upper side in FIG. 5 and FIG. 6), and a side surface of the white colored layer 2a is covered with the second transparent electrode pattern 4. Here, the width of the white colored layer 2a can be narrower than the width of the light shielding layer 2b. In this case, at least one of the first transparent electrode pattern 3 or the second transparent electrode pattern 4 can be disposed over regions of the non-contact surface 1a, the white colored layer 2a, and the light shielding layer 2b on the surfaces of the non-contact surface 1a, the white colored layer 2a, and the light shielding layer 2b on a side opposite to the substrate 1 and/or the cover glass 1G. Thus, even in a case where the transfer film is laminated over the decorative material including the white colored layer 2a which is required to have a constant thickness and the light shielding layer 2b and the non-contact surface 1a, the film transfer material (in particular, the film transfer material including the thermoplastic resin layer) is used, and thus, it is possible to perform lamination in which bubbles are not generated on a partial boundary of the white colored layer 2a by a simple step without using expensive equipments such as a vacuum laminator.

The first transparent electrode pattern 3 and the second transparent electrode pattern 4 will be described by using FIG. 8.

Figure 8:
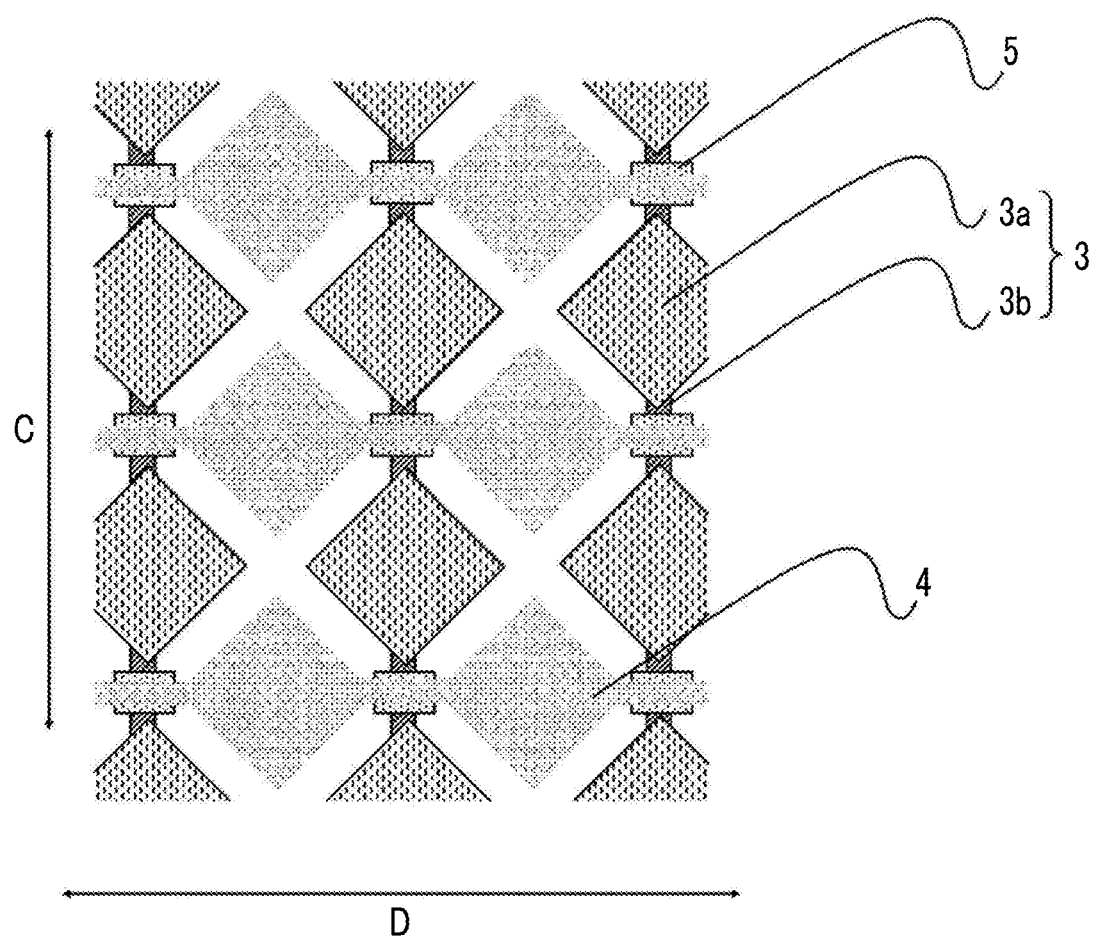
FIG. 8 is an explanatory diagram illustrating an example of a first transparent electrode pattern and a second transparent electrode pattern of the touch panel.

FIG. 8 is an explanatory diagram illustrating an example of the first transparent electrode pattern and the second transparent electrode pattern of the present invention.

As illustrated in FIG. 8, the first transparent electrode pattern 3 is formed by allowing a pad portion 3a to extend in a first direction C through a connection portion 3b. In addition, the second transparent electrode pattern 4 is electrically insulated from the first transparent electrode pattern 3 by the insulating layer 5, and is configured of a plurality of pad portions formed by extending in a direction intersecting with the first direction C (a second direction D in FIG. 8). Here, in a case where the first transparent electrode pattern 3 is formed, the pad portion 3a and the connection portion 3b may be prepared by being integrated with each other, or only the connection portion 3b is prepared, and the pad portion 3a and the second transparent electrode pattern 4 may be prepared (patterned) by being integrated with each other. In a case where the pad portion 3a and the second transparent electrode pattern 4 are prepared (patterned) by being integrated with each other, as illustrated in FIG. 8, each layer is formed such that a part of the connection portion 3b is connected to a part of the pad portion 3a, and the first transparent electrode pattern 3 is electrically insulated from the second transparent electrode pattern 4 by the insulating layer 5.

In FIG. 5 and FIG. 6, the conductive element 6 is disposed on the surface of the light shielding layer 2b on a side opposite to the non-contact surface 1a (the upper side in FIG. 5 and FIG. 6). The conductive element 6 is electrically connected to at least one of the first transparent electrode pattern 3 or the second transparent electrode pattern 4, and is another element different from the first transparent electrode pattern 3 and the second transparent electrode pattern 4. In FIG. 5 and FIG. 6, it is illustrated that the conductive element 6 is connected to the second transparent electrode pattern 4.

In addition, in FIG. 5 and FIG. 6, the transparent protective layer 7 is disposed to cover all constituents. The transparent protective layer 7 may be configured to cover only a part of each of the constituents. The insulating layer 5 and the transparent protective layer 7 may be formed of the same material, or may be formed of different materials. A material having a high surface hardness and high heat resistance is preferable as the material configuring the insulating layer 5 and the transparent protective layer 7, and a known photosensitive siloxane resin material, a known acrylic resin material, and the like are used.

Examples of an embodiment formed in a procedure of the manufacturing method of the present invention can include embodiments in FIGS. 9 to 13.

Figure 9:
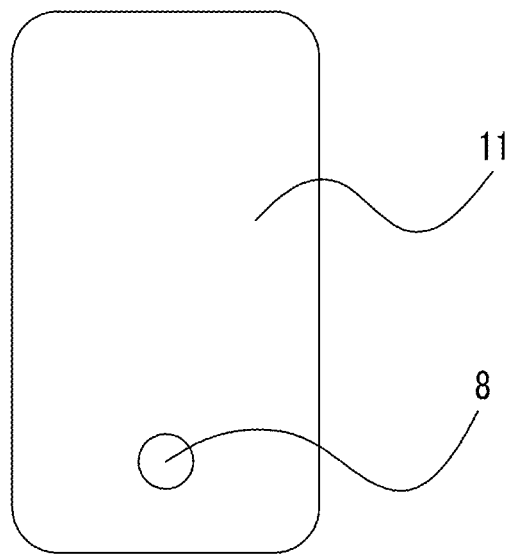
FIG. 9 is a top view illustrating an example of reinforced glass in which an opening portion is formed.
Figure 10:
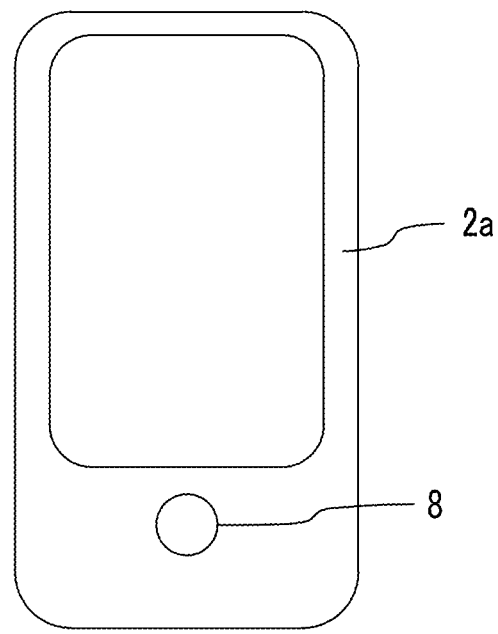
FIG. 10 is a top view illustrating an example of a state in which the decorative material is formed.
Figure 11:
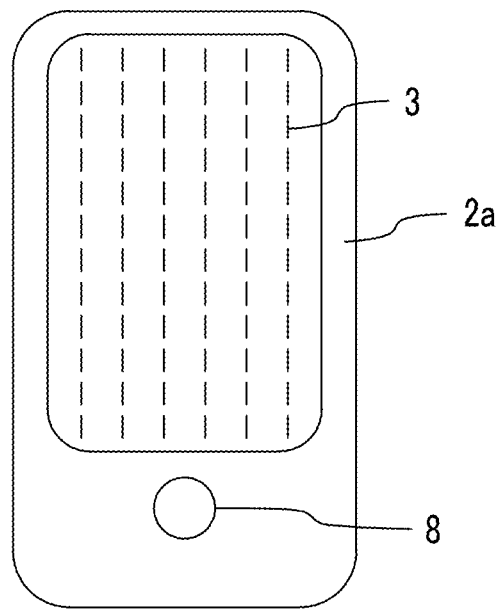
FIG. 11 is a top view illustrating an example of a state in which the first transparent electrode pattern is formed.
Figure 12:
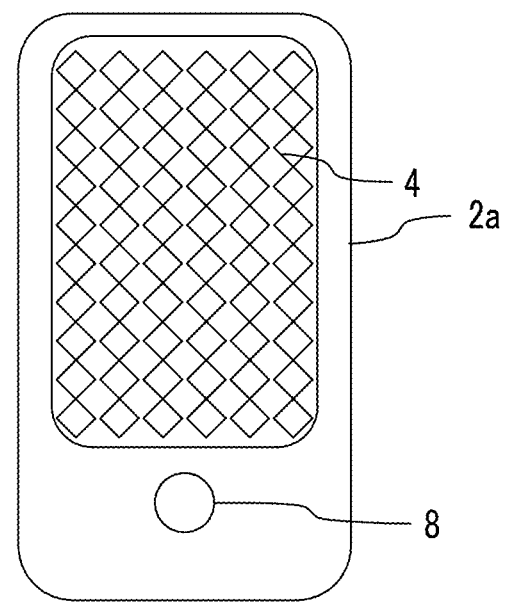
FIG. 12 is a top view illustrating an example of a state in which the first transparent electrode pattern and the second transparent electrode pattern are formed.
Figure 13:
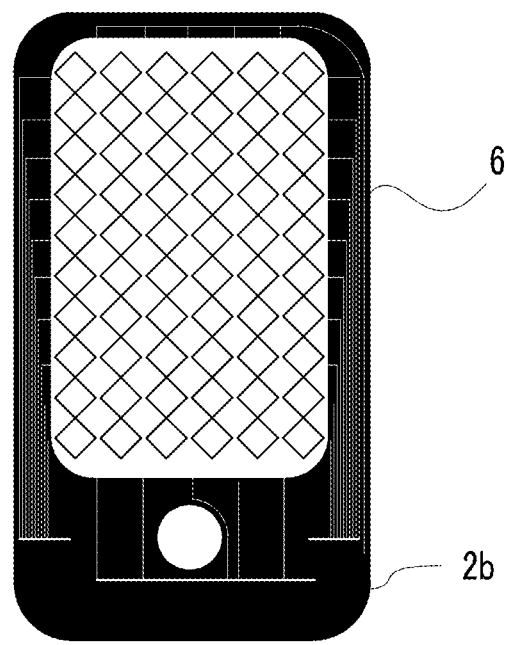
FIG. 13 is a top view illustrating an example of a state in which a conductive element different from the first transparent electrode pattern and the second transparent electrode pattern is formed.

FIG. 9 is a top view illustrating an example of reinforced glass 11 as the substrate in which the opening portion 8 is formed. FIG. 10 is a top view illustrating an example of a state in which the white colored layer 2a is formed. FIG. 11 is a top view illustrating an example of a state in which the first transparent electrode pattern 3 is formed. FIG. 12 is a top view illustrating an example of a state in which the second transparent electrode pattern 4 is formed. FIG. 13 is a top view illustrating an example of a state in which the conductive element 6 different from the first transparent electrode pattern and the second transparent electrode pattern is formed. These drawings illustrate an example in which the above description is specified, and the range of the present invention is not restrictively interpreted by the drawings.

Configurations disclosed in "Latest Touch Panel Technology" (published by THE TECHNO TIMES INC. on Jul. 6, 2009), "Technology and Development of Touch Panel" which is edited by Yuji MITANI and published by CMC Publishing Co., Ltd. (December, 2004), FPD International 2009 Forum T-11 Lecture Textbook, APPLICATION NOTE AN2292 of Cypress Semiconductor Corporation, and the like can be applied to the capacitance type input device and an image display device including the capacitance type input device as a constituent.

(Information Display Device)

An information display device of the present invention includes the touch panel of the present invention. It is effective that the touch panel of the present invention is used as an OGS type touch panel.

A mobile device is preferable as the information display device which can use the touch panel of the present invention, and examples of the information display device can include information display devices described below.

iPhone 4 (Registered Trademark) and iPad (Registered Trademark) (manufactured by Apple Inc.), Xperia (SO-01B) (manufactured by Sony Mobile Communications Inc.), Galaxy S (SC-02B) and Galaxy Tab (SC-01C) (manufactured by Samsung Electronics Co., Ltd.), BlackBerry 8707h (manufactured by Research In Motion Limited), Kindle (manufactured by Amazon.com, Inc.), and Kobo Touch (manufactured by Rakuten, Inc.).

EXAMPLES

Hereinafter, the present invention will be described in detail with reference to examples. Materials, use amounts, ratios, treatment contents, treatment sequences, and the like of the following examples can be suitably changed unless the changes cause deviance from the gist of the present invention. Accordingly, the range of the present invention will not be restrictively interpreted by the following specific examples. Furthermore, unless otherwise particularly stated, "parts" and "%" are on a mass basis.

(Preparation of Black Pigment Dispersion Liquids 1 to 9)

<Material of Pigment Dispersant>

A-1 of a material of a pigment dispersant is KF-2001 (mercapto modified dimethyl polysiloxane, manufactured by Shin-Etsu Chemical Co., Ltd.).

A-1 has a structure represented by the following formula ($R^A$ represents an arbitrary linking group, and a1 and a2 represent a natural number), and has a functional group equivalent weight of 1,900 (g/mol).

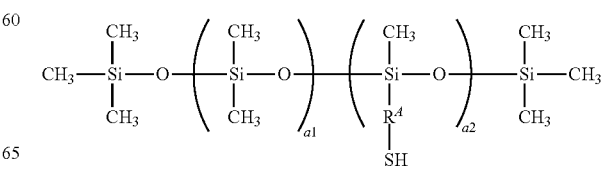

B-1 which is used as a component B (a silicone macro monomer) of the material of the pigment dispersant is X-22-174ASX (manufactured by Shin-Etsu Chemical Co., Ltd.), B-2 is X-22-174BX (manufactured by Shin-Etsu Chemical Co., Ltd.), and B-3 is KF-2012 (manufactured by Shin-Etsu Chemical Co., Ltd.). B-1, B-2, and B-3 respectively have a structure represented by the following formula (R represents an arbitrary substituent or an arbitrary linking group, and n represents a natural number), B-1 has a functional group equivalent weight of 900 (g/mol), B-2 has a functional group equivalent weight of 2,300 (g/mol), and B-3 has a functional group equivalent weight of 4,600 (g/mol).

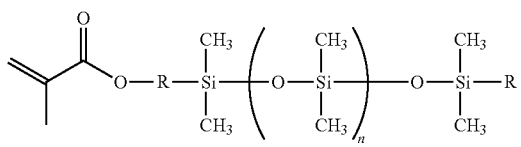

C-1 and C-2 which are used as a component C (a polymerization component having a pigment adsorption site) of the material of the pigment dispersant is a compound having a structure represented by the following formula.

C-1: R=CH$_3$, X=COOH
C-2: R=H, X=PO$_3$H$_2$

<Synthesis of Pigment Dispersant X-1>

A-1 described above (KF-2001, manufactured by Shin-Etsu Chemical Co., Ltd.) which is mercapto modified dimethyl polysiloxane, B-1 described above (X-22-174ASX, manufactured by Shin-Etsu Chemical Co., Ltd.) which is a silicone macro monomer, and C-1 described above (a methacrylic acid) as the polymerization component including the pigment adsorption site were dissolved in xylene according to Table 1-2 described below, and a polymerization initiator (dimethyl-2,2'-azobis(2-methyl propionate), "V-601") was dissolved at a ratio of 0.3 mol % with respect to the total polymerization component, and polymerization was performed at 80° C. under a nitrogen atmosphere. In the middle of the polymerization, a polymerization initiator (V-601) was added at a ratio of 0.3 mol % with respect to the total polymerization component every two hours after the polymerization was initiated, and the polymerization was performed for 4 hours in total. After the polymerization, a purification treatment and drying were performed, and thus, a pigment dispersant X-1 was obtained. The pigment dispersant X-1 has the structure represented by Formula 1 described above. The obtained pigment dispersant X-1 was set to a graft type silicone polymer of Example 1.

<Synthesis of Pigment Dispersants X-2 to X-5>

Pigment dispersants X-2 to X-5 were respectively obtained by the same method as that of the pigment dispersant X-1 except that the component A, the component B, the component C, and the ratio thereof (a copolymerization ratio) of the material of the pigment dispersant were changed according to Table 1-2 described below in the synthesis of the pigment dispersant X-1.

The pigment dispersants X-2 to X-5 has the structure represented by Formula 1 described above. The obtained pigment dispersants X-2 to X-5 were set to graft type silicone polymers of each of the examples.

<Molecular Weight of Pigment Dispersant>

Mass average molecular weights (Mw) and number average molecular weights (Mn) of the pigment dispersants X-1 to X-5 were measured by using a gel permeation chromatography (GPC). The results were shown in Table 1-2 described below. The details of a column or the like used in GPC will be described below.

Column: GPC Column TSKgelSuper HZM-H (manufactured by TOSOH CORPORATION)

Solvent: Tetrahydrofuran

Standard Substance: Monodispersed Polystyrene

<Preparation of Pigment Dispersion Liquid>

The pigment dispersant and carbon black which is a black pigment (also referred to as carbon; manufactured by Mitsubishi Chemical Corporation) were mixed at a ratio shown in Table 1-2 described below, and were dispersed by the following method, and thus, pigment dispersion liquids 1 to 9 were obtained.

Specifically, the pigment dispersant, the carbon black, and xylene were mixed, and were dispersed for 3 hours with a beads mill by using zirconia beads having a diameter of 0.5 mm, and thus, the black pigment dispersion liquids 1 to 9 were obtained.

<Evaluation of Viscosity (Dispersibility) of Pigment Dispersion Liquid>

[Initial Viscosity]

An initial viscosity and a viscosity after being aged for one week of the obtained black pigment dispersion liquids 1 to 9 were measured by using a cone plate type viscometer under an environment of 25° C.

The initial viscosity of the obtained pigment dispersion liquid was shown in Table 1-2 described below.

[Dispersibility]

Evaluation of dispersibility was performed according to the following standard.

The viscosity of the pigment dispersion liquid of each of the examples and the comparative examples after being aged for one week was evaluated as follows:

A: Less than or equal to 2 times the initial viscosity of the pigment dispersion liquids of each of the examples and the comparative examples B: Greater than 2 times and less than 3 times the initial viscosity of the pigment dispersion liquids of each of the examples and the comparative examples C: Greater than or equal to 3 times the initial viscosity of the pigment dispersion liquids of each of the examples and the comparative examples.

It is necessary that the dispersibility evaluation is evaluation A or B for practical use, and the evaluation A is preferable. The results were shown in Table 1-2 described below.

TABLE 1-2

| | | Pigment Dispersant | | | | | | Pigment | Solvent (Mass %) | Evaluation | |
|---|---|---|---|---|---|---|---|---|---|---|---|
| | | Copolymerization Ratio | | | Molecular Weight | | Added | Added | Added | | |
| | Type | Component A/Mass % | Component B/Mass % | Component C/Mass % | Mw (Ten Thousand) | Mn (Ten Thousand) | Amount (Mass %) | Type | Amount (Mass %) | Amount (Xylene) (Mass %) | Initial Viscosity (mPa·s) | Dispersibility |
| Black Pigment Dispersion Liquid 1 | X-1 | A-1/88.4 | B-1/8.4 | C-1/3.2 | 2.5 | 1.3 | 2.4 | Carbon Black | 15 | 82.6 | 3.5 | A |
| Black Pigment Dispersion Liquid 2 | X-2 | A-1/61 4 | B-2/37.2 | C-1/1.4 | 3 4 | 1.6 | 2.4 | Carbon Black | 15 | 82.6 | 2.4 | A |
| Black Pigment Dispersion Liquid 3 | X-3 | A-1/57.3 | B-2/41.6 | C-1/1.0 | 3.4 | 1.6 | 2.4 | Carbon Black | 15 | 82.6 | 3.9 | A |
| Black Pigment Dispersion Liquid 4 | X-4 | A-1/40.5 | B-3/58.8 | C-1/0.7 | 4.4 | 2.3 | 2.4 | Carbon Black | 15 | 82.6 | 2.1 | A |
| Black Pigment Dispersion Liquid 5 | X-5 | A-1/79.0 | B-1/18.7 | C-2/2.2 | 2.5 | 1.3 | 2.4 | Carbon Black | 15 | 82.6 | 4.5 | A |
| Black Pigment Dispersion Liquid 6 | X-3 | A-1/57.3 | B-2/41.6 | C-1/1.0 | 3.4 | 1.6 | 1.2 | Carbon Black | 15 | 83.8 | 3.9 | A |
| Black Pigment Dispersion Liquid 7 | X-3 | A-1/57.3 | B-2/41.6 | C-1/1.0 | 3.4 | 1.6 | 4.8 | Carbon Black | 15 | 80.2 | 3.9 | A |
| Black Pigment Dispersion Liquid 8 | | EFKA 4010 | | | 2.4 | 1.2 | 2.4 | Carbon Black | 15 | 82.6 | 4.0 | B |
| Black Pigment Dispersion Liquid 9 | | EFKA 4300 | | | 2.4 | 1.2 | 2.4 | Carbon Black | 15 | 82.6 | 3.2 | B |

Furthermore, the pigment dispersants used in the black pigment dispersion liquid 8 and the black pigment dispersion liquid 9 are as described below.

EFKA 4010: Urethane-Based Polymer Dispersant (manufactured by BASF SE)

EFKA 4300: Acryl-Based Polymer Dispersant (manufactured by BASF SE)

From Table 1-2 described above, it was found that in the pigment dispersion liquids 1 to 7 using the graft type silicone polymer, the dispersibility of the pigment was excellent, compared to the pigment dispersion liquids 8 and 9 not using the graft type silicone polymer.

Examples 1 to 14 and Comparative Examples 1 to 3

<Preparation of Decorative Material Using Pigment Dispersion Liquid>

[Preparation of Black Coloring Liquid (Composition for Forming Light Shielding Layer) and White Coloring Liquid (Composition for Forming White Colored Layer)]

Black coloring liquids (Compositions for forming a light shielding layer) 1 to 13 shown in Table 2 described below and white coloring liquids 1 to 4 shown in Table 3 described below were prepared by using the following materials. Numerical values in Table 2 and Table 3 indicate parts by mass.

TABLE 2

| | Black Coloring Liquid (Composition for Forming Light Shielding Layer) | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Black Pigment Dispersion Liquid 1 | 248.28 | 248.28 | 248.28 | 248.28 | 248.28 | — | — | — | — | — | — | — | — |
| Black Pigment Dispersion Liquid 2 | — | — | — | — | — | 248.28 | — | — | — | — | — | — | — |
| Black Pigment Dispersion Liquid 3 | — | — | — | — | — | — | 248.28 | — | — | — | — | — | — |
| Black Pigment Dispersion Liquid 4 | — | — | — | — | — | — | — | 248.28 | — | — | — | — | — |
| Black Pigment Dispersion Liquid 5 | — | — | — | — | — | — | — | — | 248.28 | — | — | — | — |

TABLE 2-continued

| Black Coloring Liquid (Composition for Forming Light Shielding Layer) | | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Black Pigment Dispersion Liquid 6 | — | — | — | — | — | — | — | — | — | 248.28 | — | — | — |
| Black Pigment Dispersion Liquid 7 | — | — | — | — | — | — | — | — | — | — | 248.28 | — | — |
| Black Pigment Dispersion Liquid 8 | — | — | — | — | — | — | — | — | — | — | — | 248.28 | — |
| Black Pigment Dispersion Liquid 9 | — | — | — | — | — | — | — | — | — | — | — | — | 248 28 |
| Silicone Resin Solution 1 | 137.97 | 135.26 | 132.66 | 127.75 | — | 135.26 | 135.26 | 135.26 | 135.26 | 135.26 | 135.26 | 135.26 | 135.26 |
| Silicone Resin Solution 2 | 114.97 | 112.72 | 110.55 | 106.46 | — | 112.72 | 112.72 | 112.72 | 112.72 | 112.72 | 112.72 | 112.72 | 112.72 |
| Silicone Resin Solution 3 | — | — | — | — | 676.32 | — | — | — | — | — | — | — | — |
| Polymerization Catalyst 1 | — | 10.82 | 21.23 | 40.88 | 10.82 | 10.82 | 10.82 | 10.82 | 10.82 | 10.82 | 10.82 | 10.82 | 10.82 |
| Coating Auxiliary Agent | 0.24 | 0.24 | 0.24 | 0.24 | 0.24 | 0.24 | 0.24 | 0.24 | 0.24 | 0.24 | 0.24 | 0.24 | 0.24 |
| Xylene | 415.45 | 409.59 | 403.95 | 393.29 | — | 409.59 | 409.59 | 409.59 | 409.59 | 409.59 | 409.59 | 409.59 | 409.59 |
| Methyl Ethyl Ketone | 83.09 | 83.09 | 83.09 | 83.09 | 64.34 | 83.09 | 83.09 | 83.09 | 83.09 | 83.09 | 83.09 | 83.09 | 83.09 |

TABLE 3

| White Coloring Liquid (Composition for Forming White Colored Layer) | | | | |
|---|---|---|---|---|
| | 1 | 2 | 3 | 4 |
| White Pigment Dispersion Liquid 1 | 195.00 | 357.50 | 195.00 | — |
| White Pigment Dispersion Liquid 2 | — | — | — | 195.00 |
| Silicone Resin Solution 1 | — | 193.77 | — | — |
| Silicone Resin Solution 2 | — | 376.78 | — | — |
| Silicone Resin Solution 3 | 770.68 | — | 770.68 | 770.68 |
| Silicone Resin Solution 4 | 22.02 | — | 22.02 | 22.02 |
| Polymerization Catalyst 1 | 0.42 | 0.77 | — | 0.42 |
| Polymerization Catalyst 2 | — | — | 0.42 | — |
| Coating Auxiliary Agent | 1.20 | 2.20 | 1.20 | 1.20 |
| Antioxidant | 0.30 | 0.55 | 0.30 | 0.30 |
| Methyl Ethyl Ketone | 10.38 | 68.44 | 10.38 | 10.38 |
| Total | 1000.00 | 1000.01 | 1000.00 | 1000.00 |

The materials or the like used in Table 2 and Table 3 are as described below.

(Silicone Resin Solution)

Silicone Resin Solution 1 (KR300, manufactured by Shin-Etsu Chemical Co., Ltd., Xylene Solution of Silicone Resin (Non-Volatile Content of 50 mass %))

Silicone Resin Solution 2 (KR311, manufactured by Shin-Etsu Chemical Co., Ltd., Xylene Solution of Silicone Resin (Non-Volatile Content of 60 mass %))

Silicone Resin Solution 3 (KR251, manufactured by Shin-Etsu Chemical Co., Ltd., Toluene Solution of Silicone Resin (Non-Volatile Content of 20 mass %))

Silicone Resin Solution 4 (X-40-9246, manufactured by Shin-Etsu Chemical Co., Ltd., Silicone Oligomer (100 mass %))

Polymerization Catalyst 1 (D-15, manufactured by Shin-Etsu Chemical Co., Ltd., Xylene Solution of Zinc-Containing Catalyst (Solid Content of 25 mass %))

Polymerization Catalyst 2 (Dibutoxy Zirconium (IV) Diacetyl Acetonate)

Antioxidant (IRGAFOS 168, manufactured by BASF SE, Compound Described below)

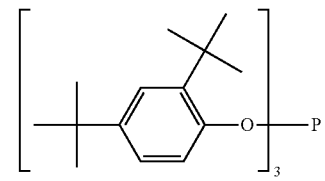

Coating Auxiliary Agent (MEGAFAC F-780F, manufactured by DIC Corporation, Methyl Ethyl Ketone Solution of Surfactant (Non-Volatile Content of 30 mass %))

In addition, a white pigment dispersion liquid 1 was prepared by the following method.

Titanium Oxide (CR97, manufactured by ISHIHARA SANGYO KAISHA, LTD.): 60.0 parts

Pigment Dispersant X-1 (Solid Content of 100%): 3.0 parts

Xylene: 37.0 parts

The components described above were mixed, and were dispersed for 2 hours with a beads mill by using zirconia beads having a diameter of 0.5 mm, and thus, the white pigment dispersion liquid 1 was obtained.

In addition, the same preparation was performed by using the pigment dispersant X-2 instead of the pigment dispersant X-1, and thus, a white pigment dispersion liquid 2 was obtained.

(Preparation of Transfer Material for Forming Decorative Material)

<Preparation of Peeling Film>

A peeling film described below was prepared as a temporary support with a peeling layer of a transfer material.

UNIPEEL TR6 (manufactured by UNITIKA LTD., an olefin-based peeling layer is provided on a PET film having a thickness of 75 μm, and a matting agent is upraised from the surface of the peeling layer by 200 nm)

<Preparation of Protective Film>
Next, a protective film described below was prepared.
ALPHAN E-501 (manufactured by Oji F-Tex Co., Ltd., Polypropylene Film Having Thickness of 12 µm)

<Preparation of Colored Layer (Transfer Layer Formed of Light Shielding Layer and/or White Colored Layer) on Temporary Support>

Any one of the black coloring liquids 1 to 13 shown in the following table which are for forming the light shielding layer was applied onto the peeling layer of the temporary support with the peeling layer by using an extrusion type coater such that a dried thickness became 3.0 µm, and was dried.

Any one of the white coloring liquids 1 to 4 shown in the following table which are for forming the white colored layer was applied onto the light shielding layer such that a dried thickness became 35.0 µm, and was dried. The protective film described above was subjected to pressure bonding onto the white colored layer.

Thus, transfer materials 1 to 16 formed of the light shielding layer and the white colored layer shown in Table 4 described below in which the temporary support, the light shielding layer, and the white colored layer were integrated were prepared. Furthermore, a transfer material 17 was prepared by applying not the black coloring liquid but the white coloring liquid 1 onto the peeling layer of the temporary support. The obtained transfer materials 1 to 17 were respectively set to transfer materials for forming a decorative material of Examples 1 to 14 and Comparative Examples 1 to 3.

Preparation of Substrate with Decorative Material
(Example 101)

The substrate 1 as illustrated in FIG. 7 on which the opening portion 8 (15 mmΦ) was formed (reinforced glass, 300 mm×400 mm×0.7 mm) was washed with a rotating brush having nylon hair while spraying a glass washing agent liquid of which the temperature was adjusted to 25° C. for 20 seconds by shower. The glass substrate was preheated at 90° C. for 2 minutes by using a substrate preheating device.

The transfer material 1 of Example 1 in which the light shielding layer and the white colored layer were laminated was molded into the shape of a frame having a size corresponding to four sides of a substrate formed of glass, and then, the protective film was peeled off. Then, the transfer material 1 was transferred onto the preheated substrate. After that, the temporary support of the transfer material 1 was peeled off In order to cure the light shielding layer and the white colored layer, the obtained film was subjected to a heat treatment on each substrate three times in the order of 150° C. for 40 minutes, 240° C. for 30 minutes, and at 280° C. for 30 minutes. Accordingly, a substrate with a decorative material of Example 101 including a decorative material formed by heating the white colored layer and the light shielding layer was obtained.

TABLE 4

|  | Transfer Material | Configuration of Transfer Material | Black Coloring Liquid for Light Shielding Layer | White Coloring Liquid for White Colored Layer |
| --- | --- | --- | --- | --- |
| Example 1 | Transfer Material 1 | Lamination of Light Shielding Layer and White Colored Layer | Black Coloring Liquid 1 | White Coloring Liquid 1 |
| Example 2 | Transfer Material 2 | Lamination of Light Shielding Layer and White Colored Layer | Black Coloring Liquid 2 | White Coloring Liquid 1 |
| Example 3 | Transfer Material 3 | Lamination of Light Shielding Layer and White Colored Layer | Black Coloring Liquid 3 | White Coloring Liquid 1 |
| Example 4 | Transfer Material 4 | Lamination of Light Shielding Layer and White Colored Layer | Black Coloring Liquid 4 | White Coloring Liquid 1 |
| Example 5 | Transfer Material 5 | Lamination of Light Shielding Layer and White Colored Layer | Black Coloring Liquid 5 | White Coloring Liquid 1 |
| Example 6 | Transfer Material 6 | Lamination of Light Shielding Layer and White Colored Layer | Black Coloring Liquid 6 | White Coloring Liquid 1 |
| Example 7 | Transfer Material 7 | Lamination of Light Shielding Layer and White Colored Layer | Black Coloring Liquid 7 | White Coloring Liquid 1 |
| Example 8 | Transfer Material 8 | Lamination of Light Shielding Layer and White Colored Layer | Black Coloring Liquid 8 | White Coloring Liquid 1 |
| Example 9 | Transfer Material 9 | Lamination of Light Shielding Layer and White Colored Layer | Black Coloring Liquid 9 | White Coloring Liquid 1 |
| Example 10 | Transfer Material 10 | Lamination of Light Shielding Layer and White Colored Layer | Black Coloring Liquid 1 | White Coloring Liquid 2 |
| Example 11 | Transfer Material 11 | Lamination of Light Shielding Layer and White Colored Layer | Black Coloring Liquid 1 | White Coloring Liquid 3 |
| Example 12 | Transfer Material 12 | Lamination of Light Shielding Layer and White Colored Layer | Black Coloring Liquid 1 | White Coloring Liquid 4 |
| Example 13 | Transfer Material 13 | Lamination of Light Shielding Layer and White Colored Layer | Black Coloring Liquid 10 | White Coloring Liquid 1 |
| Example 14 | Transfer Material 14 | Lamination of Light Shielding Layer and White Colored Layer | Black Coloring Liquid 11 | White Coloring Liquid 1 |
| Comparative Example 1 | Transfer Material 15 | Lamination of Light Shielding Layer and White Colored Layer | Black Coloring Liquid 12 | White Coloring Liquid 1 |
| Comparative Example 2 | Transfer Material 16 | Lamination of Light Shielding Layer and White Colored Layer | Black Coloring Liquid 13 | White Coloring Liquid 1 |
| Comparative Example 3 | Transfer Material 17 | Lamination of White Colored Layer | None | White Coloring Liquid 1 |

Preparation of Substrate with Decorative Material (Examples 102 to 114 and Comparative Examples 101 to 103)

White substrates with a decorative material of Examples 102 to 114 and Comparative Examples 101 to 103 in which the light shielding layer and the white colored layer were formed on the substrate were obtained by the same method as that in Example 101 except that the used transfer material 1 was changed as shown in Table 4 described above in Example 101.

<Evaluation>

An evaluation method of properties of the substrate with a decorative material of each of the examples obtained as described above will be described below. In addition, the obtained results were shown in Table 5 described below.

(Heat Resistance Evaluation Using Coloration (Heat Resistance Evaluation))

A reflection spectrum of samples for heat resistance evaluation of each of the examples and the comparative examples on the glass side was measured by a spectrophotometer with an integrating sphere, and color coordinates L*a*b* were calculated on the basis of the measured reflection spectrum. L* mainly indicates brightness of the samples for heat resistance evaluation, a* mainly indicates redness of the samples for heat resistance evaluation, and b* mainly indicates a yellow tint of the samples for heat resistance evaluation.

Evaluation was performed as described below by using b* which is easily affected by a heat treatment as an index.

A: $b^* \leq -0.1$
B: $0.1 < b^* \leq 0.5$
C: $0.5 < b^* \leq 1$
D: $b^* > 1$

It is necessary that heat resistance evaluation using coloration is evaluations A and B for practical use, and the evaluation A is preferable.

The obtained results were shown in Table 5 described below.

(Optical Density)

In the substrates with a decorative material of each of the examples and the comparative examples prepared as described above, an optical density in a region in which the decorative material was formed was measured by using BMT-1 manufactured by SAKATA INX CORPORATION.

TABLE 5

| | Transfer Material | Heat Resistance Evaluation | Optical Density |
|---|---|---|---|
| Example 101 | Transfer Material 1 | B | 4.8 |
| Example 102 | Transfer Material 2 | B | 4.9 |
| Example 103 | Transfer Material 3 | A | 5.0 |
| Example 104 | Transfer Material 4 | A | 4.9 |
| Example 105 | Transfer Material 5 | A | 4.8 |
| Example 106 | Transfer Material 6 | A | 5.0 |
| Example 107 | Transfer Material 7 | A | 4.8 |
| Example 108 | Transfer Material 8 | A | 5.0 |
| Example 109 | Transfer Material 9 | A | 4.8 |
| Example 110 | Transfer Material 10 | A | 4.9 |
| Example 111 | Transfer Material 11 | A | 5.0 |
| Example 112 | Transfer Material 12 | A | 4.8 |
| Example 113 | Transfer Material 13 | A | 4.9 |
| Example 114 | Transfer Material 14 | A | 5.0 |
| Comparative Example 101 | Transfer Material 15 | C | 4.9 |
| Comparative Example 102 | Transfer Material 16 | C | 5.0 |
| Comparative Example 103 | Transfer Material 17 | A | 1.0 |

From Table 5 described above, the substrates with a decorative material of Examples 101 to 114 had small coloration after being heated, and were preferable as a white decorative material for a front plate integrated type touch panel.

In contrast, the substrates with a decorative material of Comparative Examples 101 and 102 were colored after being heated, and thus, were not preferable as a decorative material for a front plate integrated type touch panel.

In addition, the substrate with a decorative material of Comparative Example 103 had small coloration after being heated, but the back surface of the substrate was seen, and thus, were not preferable as the decorative material for a front plate integrated type touch panel (in particular, the white decorative material).

Example 201: Preparation of Touch Panel

<Formation of First Transparent Electrode Pattern>
[Formation of Transparent Electrode Layer]

The substrate with a decorative material of Example 101 was introduced into a vacuum chamber, and an ITO thin film having a thickness of 40 nm was formed on the light shielding layer by DC magnetron sputtering (Conditions: Temperature of Front Plate of 250° C., Argon Pressure of 0.13 Pa, and Oxygen Pressure of 0.01 Pa) using an ITO target in which a content rate of $SnO_2$ is 10 mass % (Indium:Tin=95:5 (Molar Ratio)), and thus, a front plate was obtained in which a transparent electrode layer was formed. Surface electrical resistance of the ITO thin film was 80 Ω/square.

The transparent electrode layer of the front plate was patterned by using a transfer film E1 for etching, and thus, a first transparent electrode pattern was formed. The transfer film E1 for etching includes a temporary support, a thermoplastic resin layer, an interlayer (an oxygen blocking film), a photocurable resin layer for etching, and a protective film in this order.

<Preparation of Photosensitive Film E1 for Etching>

A coating liquid for a thermoplastic resin layer formed of Formulation H1 described below was applied onto a temporary support which is a polyethylene terephthalate film having a thickness of 75 μm by using a slit-like nozzle, and was dried. Next, a coating liquid for an interlayer formed of Formulation P1 described below was applied and dried. Further, a coating liquid for a photocurable resin layer for etching formed of Formulation E1 described below was applied and dried. Thus, a laminate formed of the thermoplastic resin layer having a dried film thickness of 15.1 μm, the photocurable resin layer for etching having a film thickness of 2.0 μm, and the interlayer having a dried film thickness of 1.6 μm was formed on the temporary support, and finally, the protective film (a polypropylene film having a thickness of 12 μm) was subjected to pressure bonding on the laminate. Thus, a photosensitive film E1 for etching was prepared in which the temporary support, the thermoplastic resin layer, the interlayer, the photocurable resin layer for etching, and the protective film were integrated.

<Coating Liquid for Thermoplastic Resin Layer: Formulation H1>

Methanol: 11.1 parts by mass

Propylene Glycol Monomethyl Ether Acetate: 6.36 parts by mass

Methyl Ethyl Ketone: 52.4 parts by mass

Methyl Methacrylate/2-Ethyl Hexyl Acrylate/Benzyl Methacrylate/Methacrylic Acid Copolymer (Copolymerization Compositional Ratio (Molar Ratio)=55/11.7/4.5/28.8, Weight-Average Molecular Weight=100,000, Tg≅70° C.): 5.83 parts by mass Styrene/Acrylic Acid Copolymer (Copolymerization Compositional Ratio (Molar Ratio)=63/37, Weight-Average Molecular Weight=10,000, Tg≅100° C.): 13.6 parts by mass Monomer 1 (Product Name: BPE-500, manufactured by Shin Nakamura Chemical Co., Ltd.): 9.1 parts by mass Fluorine-Based Polymer: 0.54 parts by mass The fluorine-based polymer described above is a copolymer having $C_6F_{13}CH_2CH_2OCOCH=CH_2$ of 40 parts, $H(OCH(CH_3)CH_2)_7OCOCH=CH_2$ of 55 parts, and $H(OCHCH_2)_7OCOCH=CH_2$ of 5 parts, and is a solution in which a weight-average molecular weight is 30,000, and a content of methyl ethyl ketone is 30 mass % (Product Name: MEGAFAC F780F, manufactured by DIC Corporation).

Furthermore, a viscosity of a coating liquid H1 for a thermoplastic resin layer at 120° C. after removing a solvent was 1,500 Pa·sec.

<Coating Liquid for Interlayer: Formulation P1>

Polyvinyl Alcohol: 32.2 parts by mass (Product Name: PVA205, manufactured by KURARAY CO., LTD., Degree of Saponification=88%, Degree of Polymerization of 550)

Polyvinyl Pyrrolidone: 14.9 parts by mass (Product Name: K-30, manufactured by Ashland Japan Co., Ltd.)

Distilled Water: 524 parts by mass

Methanol: 429 parts by mass

<Coating Liquid for Photocurable Resin Layer for Etching: Formulation E1>

Methyl Methacrylate/Styrene/Methacrylic Acid Copolymer (Copolymer Composition (Mass %): 31/40/29, Weight-Average Molecular Weight of 60,000, and Acid Value of 163 mgKOH/g): 16 parts by mass Monomer 1 (Product Name: BPE-500, manufactured by Shin Nakamura Chemical Co., Ltd.): 5.6 parts by mass Adduct of 0.5 moles of Tetraethylene Oxide Monomethacrylate of Hexamethylene Diisocyanate: 7 parts by mass Cyclohexane Dimethanol Monoacrylate as Compound Having One Polymerizable Group in Molecules: 2.8 parts by mass 2-Chloro-N-Butyl Acridone: 0.42 parts by mass 2,2-Bis(o-Chlorophenyl)-4,4',5,5'-Tetraphenyl Biimidazole: 2.17 parts by mass Malachite Green Oxalate: 0.02 parts by mass Leuco Crystal Violet: 0.26 parts by mass Phenothiazine: 0.013 parts by mass Surfactant (Product Name: MEGAFAC F-780F, manufactured by DIC Corporation): 0.03 parts by mass Methyl Ethyl Ketone: 40 parts by mass 1-Methoxy-2-Propanol: 20 parts by mass Furthermore, a viscosity of a coating liquid E1 for a photocurable resin layer for etching at 100° C. after removing a solvent was 2,500 Pa·sec.

[Formation of First Transparent Electrode Pattern]

The front plate in which the white colored layer, the light shielding layer, and the transparent electrode layer were formed was washed. Next, the transfer film E1 for etching from which the protective film was removed was laminated on the front plate (Temperature of Front Plate: 130° C., Temperature of Rubber Roller: 120° C., Line Pressure: 100 N/cm, Handling Speed: 2.2 m/minute). The temporary support of the transfer film E1 for etching was peeled off, and then, a distance between a surface of an exposure mask (a quartz exposure mask having a transparent electrode pattern) and the photocurable resin layer for etching of the transfer film E1 for etching was set to 200 μm, and pattern exposure was performed at an exposure amount of 50 mJ/cm² (an i line).

Next, a treatment was performed at 25° C. for 100 seconds by using a triethanol amine-based developer (containing 30 mass % of triethanol amine, a liquid in which Product Name: T-PD2 (manufactured by FUJIFILM Corporation) was diluted 10 times with pure water), and a treatment was performed at 33° C. for 20 seconds by using a surfactant-containing washing liquid (a liquid in which Product Name: T-SD3 (manufactured by FUJIFILM Corporation) was diluted 10 times with pure water), and then, a residue in the thermoplastic resin layer and the interlayer was removed by using a rotating brush and an ultrahigh pressure washing nozzle, and a postbaking treatment was performed at 130° C. for 30 minutes, and thus, a front plate was obtained in which the white colored layer, the light shielding layer, the transparent electrode layer, and the photocurable resin layer for etching pattern were formed.

The front plate in which the white colored layer, the light shielding layer, the transparent electrode layer, and the photocurable resin layer for etching pattern were formed was dipped in an etching tank into which an ITO etchant (an aqueous solution of a hydrochloric acid and potassium chloride, and a liquid temperature of 30° C.) was put, a treatment was performed for 100 seconds, and the transparent electrode layer in an exposed region which was not covered with the photocurable resin layer for etching was dissolved and removed. Thus, a front plate with a transparent electrode layer pattern including the white colored layer, the light shielding layer, the transparent electrode layer pattern, and the photocurable resin layer for etching pattern was obtained.

Next, the front plate with a transparent electrode layer pattern was dipped in a resist peeling tank into which a resist peeling liquid (N-methyl-2-pyrrolidone, monoethanol amine, and a surfactant (Product Name: SUFYNOL 465, manufactured by Air Products and Chemicals, Inc.), and a liquid temperature of 45° C.) was put, a treatment was performed for 200 seconds, and the photocurable resin layer for etching was removed. Thus, a front plate was obtained in which the white colored layer, the light shielding layer, and the first transparent electrode pattern were formed. The first transparent electrode pattern was disposed over both regions of a non-contact surface and the surface of the light shielding layer on a side opposite to the front plate.

[Formation of Insulating Layer]

<<Preparation of Transfer Film W1 for Forming Insulating Layer>>

A transfer film W1 for forming an insulating layer was obtained in which the temporary support, the thermoplastic resin layer, the interlayer (oxygen blocking film), the photocurable resin layer for an insulating layer, and the protective film were integrated (a film thickness of the photocurable resin layer for an insulating layer was 1.4 μm) by the same preparation as that of the transfer film E1 for etching except that the coating liquid for a photocurable resin layer for etching described above was changed to a coating liquid for forming an insulating layer formed of Formulation W1 described below in the preparation of the transfer film E1 for etching.

—Coating Liquid for Forming Insulating Layer: Formulation W1—

Binder 3 (1-Methoxy-2-Propanol of Glycidyl Methacrylate Adduct (d) of Cyclohexyl Methacrylate (a)/Methyl Methacrylate (b)/Methacrylic Acid Copolymer (c) (Composition (Mass %): a/b/c/d=46/1/10/43, Mass Average Molecular Weight: 36,000, Acid Value of 66 mgKOH/g), Methyl Ethyl Ketone Solution (Solid Content: 45%)): 12.5 parts by mass Propylene Glycol Monomethyl Ether Acetate Solution (76 mass %) of DPHA (Dipentaerythritol Hexaacrylate, manufactured by Nippon Kayaku Co., Ltd.): 1.4 parts by mass Urethane-Based Monomer (Product Name: NK OLIGO UA-32P, manufactured by Shin Nakamura Chemical Co., Ltd.: Non-Volatile Content of 75%, Propylene Glycol Monomethyl Ether Acetate: 25%): 0.68 parts by mass Tripentaerythritol Octaacrylate (Product Name: V#802, manufactured by OSAKA ORGANIC CHEMICAL INDUSTRY LTD.): 1.8 parts by mass Diethyl Thioxanthone: 0.17 parts by mass 2-(Dimethyl Amino)-2-[(4-Methyl Phenyl) Methyl]-1-[4-(4-Morpholinyl) Phenyl]-1-Butanone (Product Name: Irgacure379, manufactured by BASF SE): 0.17 parts by mass Dispersant (Product Name: SOLSPERSE 20000, manufactured by Nitto Denko Avecia Inc.): 0.19 parts by mass Surfactant (Product Name: MEGAFAC F-780F, manufactured by DIC Corporation): 0.05 parts by mass Methyl Ethyl Ketone: 23.3 parts by mass Propylene Glycol Monomethyl Ether Acetate: 59.8 parts by mass Furthermore, a viscosity of a coating liquid for forming an insulating layer W1 at 100° C. after removing a solvent was 4,000 Pa·sec.

A front plate with the white colored layer, the light shielding layer, and the first transparent electrode pattern described above was washed. Next, the transfer film W1 for forming an insulating layer from which the protective film was removed was laminated on the front plate (Temperature of Front Plate: 100° C., Temperature of Rubber Roller: 120° C., Line Pressure: 100 N/cm, and Handling Speed: 2.3 m/minute). The temporary support of the transfer film W1 for forming an insulating layer was peeled off, and then, a distance between a surface of an exposure mask (a quartz exposure mask having a pattern for an insulating layer) and the photocurable resin layer for an insulating layer of the transfer film W1 for forming an insulating layer was set to 100 µm, and pattern exposure was performed at an exposure amount of 30 mJ/cm$^2$ (an i line).

Next, a treatment was performed at 33° C. for 60 seconds by using a triethanol amine-based developer (containing 30 mass % of triethanol amine, a liquid in which Product Name: T-PD2 (manufactured by FUJIFILM Corporation) was diluted 10 times with pure water), a treatment was performed at 25° C. for 50 seconds by using a sodium carbonate/sodium hydrogen carbonate-based developer (a liquid in which Product Name: T-CD1 (manufactured by FUJIFILM Corporation) was diluted 5 times with pure water), and a treatment was performed at 33° C. for 20 seconds by using a surfactant-containing washing liquid (a liquid in which Product Name: T-SD3 (manufactured by FUJIFILM Corporation) was diluted 10 times with pure water), a residue was removed by using a rotating brush and an ultrahigh pressure washing liquid, and a postbaking treatment was performed at 230° C. for 60 minutes. Thus, a front plate was obtained in which the white colored layer, the light shielding layer, the first transparent electrode pattern, and the insulating layer pattern were formed.

[Formation of Second Transparent Electrode Pattern]
<<Formation of Transparent Electrode Layer>>

The front plate in which the white colored layer, the light shielding layer, the first transparent electrode pattern, and the insulating layer pattern were formed was subjected to a DC magnetron sputtering treatment (Conditions: Temperature of Substrate of 50° C., Argon Pressure of 0.13 Pa, and Oxygen Pressure of 0.01 Pa), and thus, an ITO thin film having a thickness of 80 nm was formed by the same formation as that of the first transparent electrode pattern. Thus, a front plate was obtained in which the white colored layer, the light shielding layer, the first transparent electrode pattern, the insulating layer pattern, and the transparent electrode layer were formed. Surface electrical resistance of the ITO thin film was 110 Ω/square.

A front plate was obtained in which the white colored layer, the light shielding layer, the first transparent electrode pattern, the insulating layer pattern, the transparent electrode layer, and the photocurable resin layer for etching pattern were formed by the same formation as that of the first transparent electrode pattern and by using the transfer film E1 for etching (Postbaking Treatment; at 130° C. for 30 minutes).

Further, etching was performed (at 30° C. for 50 seconds), and the photocurable resin layer for etching was removed (at 45° C. for 200 seconds) by the same formation as that of the first transparent electrode pattern, and thus, a front plate was obtained in which the white colored layer, the light shielding layer, the first transparent electrode pattern, the insulating layer pattern, and the second transparent electrode pattern were formed. As illustrated in FIG. 5, the second transparent electrode pattern 4 is disposed over both regions of the non-contact surface 1a and the surface (the upper side in FIG. 5) of the light shielding layer 2b on a side opposite to the front plate (the substrate 1).

[Formation of Conductive Element Different from First Transparent Electrode Pattern and Second Transparent Electrode Pattern]

The front plate in which the white colored layer, the light shielding layer, the first transparent electrode pattern, the insulating layer pattern, and the second transparent electrode pattern were formed was subjected to a DC magnetron sputtering treatment by the same formation as that of the first transparent electrode pattern and the second transparent electrode pattern. Thus, a front plate was obtained in which an aluminum (Al) thin film having a thickness of 200 nm was formed.

A front plate was obtained in which the white colored layer, the light shielding layer, the first transparent electrode pattern, the insulating layer pattern, the second transparent electrode pattern, the aluminum thin film, and the photocurable resin layer for etching pattern were formed by the same formation as that of the first transparent electrode pattern and the second transparent electrode pattern and by using the transfer film E1 for etching (Postbaking Treatment; at 130° C. for 30 minutes).

Further, etching was performed (at 30° C. for 50 seconds), and the photocurable resin layer for etching was removed (at 45° C. for 200 seconds) by the same formation as that of the first transparent electrode pattern. Thus, a front plate was obtained in which the white colored layer, the light shielding layer, the first transparent electrode pattern, the insulating layer pattern, the second transparent electrode pattern, and the conductive element different from the first transparent electrode pattern and the second transparent electrode pattern (hereinafter, also simply referred to as "another conductive element") were formed.

[Formation of Transparent Protective Layer]

The transfer film W1 for forming an insulating layer from which the protective film was removed was laminated on the front plate in which the another conductive element was formed by the same formation as that of the insulating layer, the temporary support of the transfer film W1 for forming an insulating layer was peeled off, and then, entire surface exposure was performed at an exposure amount of 50 mJ/cm$^2$ (an i line) without using an exposure mask, and development, postexposure (1,000 mJ/cm$^2$), and a postbaking treatment were performed. Thus, a front plate was obtained in which the transparent protective layer (the insulating layer) was laminated. As illustrated in FIG. 5, the transparent protective layer 7 was formed to cover all of the white colored layer 2a, the light shielding layer 2b, the first transparent electrode pattern 3, the insulating layer pattern 5, the second transparent electrode pattern 4, and the conductive layer 6. The obtained front plate can be used as a capacitance type input device.

<Preparation of Image Display Device (Touch Panel)>

The front plate manufactured as described above (the capacitance type input device) was bonded to a liquid crystal display element manufactured by a method described in paragraphs <0097> to <0119> of JP2009-47936A, and an image display device of Example 201 including the capacitance type input device as a constituent was prepared by a known method.

Image display devices were prepared by using the substrates with a decorative material of Examples 102 to 114 and Comparative Examples 101 to 103 instead of the substrate with a decorative material of Example 101, and thus, image display devices of Examples 202 to 214 and Comparative Examples 201 to 203 were prepared.

<Total Evaluation of Front Plate and Image Display Device>

In each of the steps described above, in the front plate (the capacitance type input device) in which the white colored layer, the light shielding layer, the first transparent electrode pattern, the insulating layer pattern, the second transparent electrode pattern, and the another conductive element were formed, the opening portion and the back surface were not contaminated and were easily washed, and other members were not contaminated.

In addition, in the white colored layer, a pin hole was not formed, and there was no problem in unevenness. Similarly, in the light shielding layer, a pin hole was not formed, and light shielding properties were excellent.

Therefore, there was no problem in conductivity of each of the first transparent electrode pattern, the second transparent electrode pattern, and the another conductive element. In addition, the insulating properties were provided between the first transparent electrode pattern and the second transparent electrode pattern.

Further, even in the transparent protective layer, a defect such as air bubbles did not occur, and an image display device having excellent display properties and excellent operating properties was obtained.

<Appearance Evaluation of Front Plate and Image Display Device>

As with the substrate with a decorative material, heat resistance evaluation and optical density evaluation were performed. The results are shown in Table 6.

TABLE 6

|  | White Decorative Material | Heat Resistance Evaluation | Optical Density |
| --- | --- | --- | --- |
| Example 201 | Example 101 | B | 4.9 |
| Example 202 | Example 102 | B | 5.0 |
| Example 203 | Example 103 | B | 5.0 |
| Example 204 | Example 104 | A | 4.8 |
| Example 205 | Example 105 | A | 4.9 |
| Example 206 | Example 106 | A | 5.0 |
| Example 207 | Example 107 | A | 4.9 |
| Example 208 | Example 108 | A | 5.0 |
| Example 209 | Example 109 | A | 4.9 |
| Example 210 | Example 110 | A | 4.9 |
| Example 211 | Example 111 | A | 4.9 |
| Example 212 | Example 112 | A | 5.0 |
| Example 213 | Example 113 | A | 4.9 |
| Example 214 | Example 114 | A | 5.0 |
| Comparative Example 201 | Comparative Example 101 | D | 4.8 |
| Comparative Example 202 | Comparative Example 102 | D | 4.9 |
| Comparative Example 203 | Comparative Example 103 | A | 1.1 |

In the white colored layers of the image devices of Examples 201 to 214, there was not problem in a whiteness. In contrast, the white colored layers of the image devices of Comparative Examples 201 and 202 were colored with a yellow color, and did not withstand use as a decorative material.

In addition, in the image display device of Comparative Example 203, the shadow of wiring which was formed on the back surface of the light shielding layer was observed on the substrate by a backlight of the image display device, and there was a problem in appearance.

EXPLANATION OF REFERENCES

1: substrate
1G: cover glass
2a: white colored layer
2b: light shielding layer
2c: tilt portion
3: conductive layer (first transparent electrode pattern)
3a: pad portion
3b: connection portion
4: conductive layer (second transparent electrode pattern)
5: insulating layer
6: conductive layer (other conductive element)
7: transparent protective layer
8: opening portion
10: capacitance type input device
11: reinforced glass
C: first direction
D: second direction

What is claimed is:

1. A substrate with a decorative material, comprising:
a substrate;
a white colored layer; and
a light shielding layer in this order,
wherein the light shielding layer contains a black pigment and a graft type silicone polymer, and the graft type silicone polymer is a compound represented by Formula 1 described below,

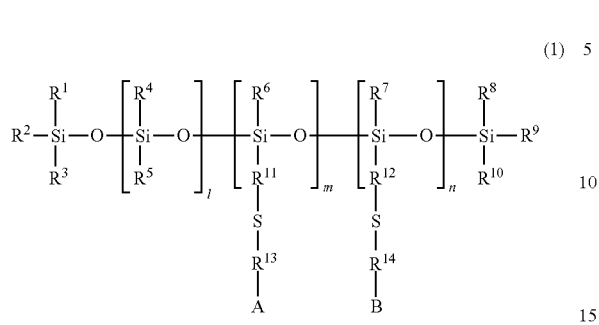

(1)

in Formula 1, $R^1$ to $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, $R^{13}$ and $R^{14}$ each independently represent a single bond or a divalent organic linking group, A represents a group having a pigment adsorption site, B represents a group having a structure represented by Formula 2 described below, l and n each independently represent an integer of greater than or equal to 1, and m represents an integer of greater than or equal to 0,

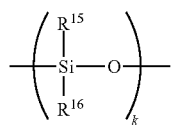

(2)

in Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

2. The substrate with a decorative material according to claim 1, wherein in Formula 1, m represents an integer of greater than or equal to 1.

3. The substrate with a decorative material according to claim 1, wherein the white colored layer contains titanium dioxide.

4. The substrate with a decorative material according to claim 1, wherein the black pigment is carbon black.

5. The substrate with a decorative material according to claim 1, wherein the white colored layer contains a graft type silicone polymer.

6. The substrate with a decorative material according to claim 5, wherein the graft type silicone polymer contained in the white colored layer is a compound represented by Formula 1 described below,

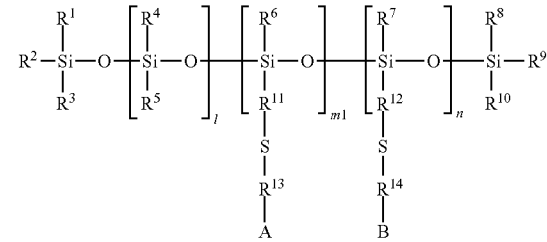

(1)

in Formula 1, $R^1$ to $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, $R^{13}$ and $R^{14}$ each independently represent a single bond or a divalent organic linking group, A represents a group having a pigment adsorption site, B represents a group having a structure represented by Formula 2 described below, l and n each independently represent an integer of greater than or equal to 1, and m represents an integer of greater than or equal to 0,

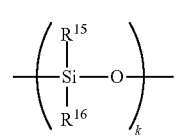

(2)

in Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

7. A transfer material for forming a decorative layer, comprising:

a temporary support;

a light shielding layer; and a white colored layer in this order, wherein the light shielding layer contains a black pigment and a graft type silicone polymer, and the graft type silicone polymer is a compound represented by Formula 1 described below,

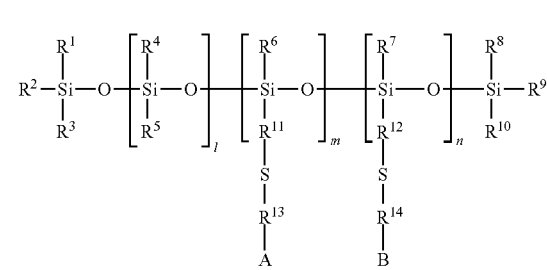

(1)

in Formula 1, $R^1$ to $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, $R^{13}$ and $R^{14}$ each independently represent a single bond or a divalent organic linking group, A represents a group having a pigment adsorption site, B represents a group having a structure represented by Formula 2 described below, l and n each independently represent an integer of greater than or equal to 1, and m represents an integer of greater than or equal to 0,

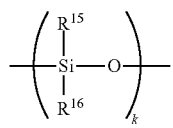

(2)

in Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

8. A touch panel, comprising:
the substrate with a decorative material according to claim 1.

9. An information display device, comprising:
the touch panel according to claim 8.

10. A substrate with a decorative material, comprising:
a substrate;
a white colored layer containing a graft type silicone polymer; and
a light shielding layer in this order,
wherein the light shielding layer contains a black pigment and a graft type silicone polymer, and
the graft type silicone polymer contained in the white colored layer is a compound represented by Formula 1 described below,

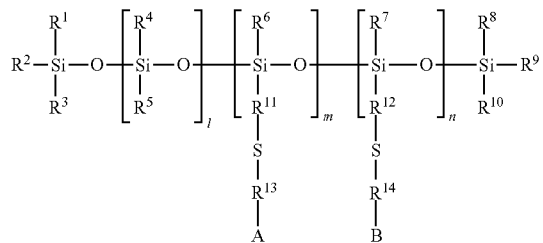

(1)

in Formula 1, $R^1$ to $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, $R^{13}$ and $R^{14}$ each independently represent a single bond or a divalent organic linking group, A represents a group having a pigment adsorption site, B represents a group having a structure represented by Formula 2 described below, l and n each independently represent an integer of greater than or equal to 1, and m represents an integer of greater than or equal to 0,

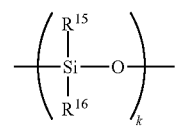

(2)

in Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

11. A transfer material for forming a decorative layer, comprising:
a temporary support;
a light shielding layer containing a graft type silicone polymer; and
a white colored layer in this order,
wherein the light shielding layer contains a black pigment and a graft type silicone polymer, and
the graft type silicone polymer contained in the white colored layer is a compound represented by Formula 1 described below,

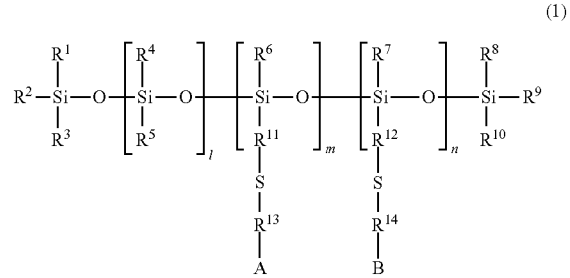

(1)

in Formula 1, $R^1$ to $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, $R^{13}$ and $R^{14}$ each independently represent a single bond or a divalent organic linking group, A represents a group having a pigment adsorption site, B represents a group having a structure represented by Formula 2 described below, l and n each independently represent an integer of greater than or equal to 1, and m represents an integer of greater than or equal to 0,

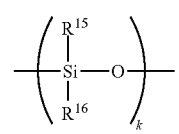

(2)

in Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

* * * * *